United States Statutory Invention Registration [19]

[11] Reg. Number: H809

Andoh et al. [43] Published: Aug. 7, 1990

[54] METHOD FOR PROCESSING SILVER HALIDE COLOR PHOTOGRAPHIC MATERIAL

[75] Inventors: Kazuto Andoh; Takatoshi Ishikawa; Hiroshi Fujimoto; Morio Yagihara, all of Kanagawa, Japan

[73] Assignee: Fuji Photo Film Co., Ltd., Minami-Ashigara, Japan

[21] Appl. No.: 299,487

[22] Filed: Jan. 23, 1989

[30] Foreign Application Priority Data

Jan. 21, 1988 [JP] Japan ..... 63-11294

[51] Int. Cl.[5] ..... G03C 7/46; G03C 5/18; G03C 5/26; G03C 1/08

[52] U.S. Cl. ..... 430/386; 430/380; 430/434; 430/467; 430/468; 430/558

[58] Field of Search ..... 430/380, 558, 434, 467, 430/468

[56] References Cited

U.S. PATENT DOCUMENTS 4,801,521 1/1989 Ohki et al. ..... 430/486

FOREIGN PATENT DOCUMENTS 8704534 7/1987 PCT Int'l Appl. ..... 430/467

*Primary Examiner*—John S Maples
*Assistant Examiner*—Philip Tucker
*Attorney, Agent, or Firm*—Sughrue, Mion, Zinn, Macpeak & Seas

[57] ABSTRACT

A method for processing a silver halide color photographic material containing at least one pyrazoloazole magenta coupler represented by general formula (I), which comprises processing the light-sensitive material, after imagewise exposure, with a color developer containing an aromatic primary amine color developing agent and at least one member selected from among hydrazines and hydrazides represented by general formula (II):

(I)

wherein $R_{11}$ represents a hydrogen atom or a substituent, X represents a hydrogen atom or a group capable of being eliminated by a coupling reaction with an oxidation product of an aromatic primary amine developing agent, Za, Zb and Zc each represents a methine group, a substituted methine group, =N— or —NH—, provided that one of the Za-Zb bond and the Zb-Zc bond is a double bond and the other is a single bond and, when Zb-Zc is a carbon-to-carbon double bond, it may be a part of an aromatic ring, and a dimer or higher polymer may be formed at $R_{11}$ or X, or, when Za, Zb or Zc represents a substituted methine group, a dimer or higher polymer may be formed at the substituted methine group;

(II)

wherein $R^1$, $R^2$ and $R^3$ each independently represents a hydrogen atom, an alkyl group, an aryl group or a meterocyclic group, $R^4$ represents a hydrogen atom, a hydroxy group, a hydrazino group, an alkyl group, an aryl group, a heterocyclic group, an alkoxy group, an aryloxy group, a carbamoyl group or an amino group, $X^1$ represents a divalent group, and n represents 0 to 1, provided that, when n is 0, $R^4$ represents an alkyl group, an aryl group or a heterocyclic group, and that $R^3$ and $R^4$ may together form a heterocyclic ring.

8 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD FOR PROCESSING SILVER HALIDE COLOR PHOTOGRAPHIC MATERIAL

FIELD OF THE INVENTION

This invention relates to a method for processing a silver halide color photographic material and, more particularly, to a method which is excellent in processing properties, color-forming properties, and color fading resistance and, further, provides a color developer having excellent stability.

BACKGROUND OF THE INVENTION

Magenta couplers represented by the following general formula (I) are known from, for example, JP-A No. 59-162548 (The term "JP-A" as used herein means an "unexamined published Japanese patent application"), JP-A No. 60-43659, JP-A No. 59-171956, JP-A No. 60-172982, and JP-A No. 60-33552, and U.S. Pat. No. 3,061,432, and various studies have been made thereon due to their excellent hues:

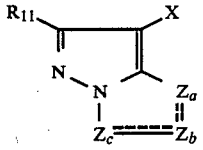

(I)

wherein $R_{11}$ represents a hydrogen atom or a substituent, X represents a hydrogen atom or a group capable of being eliminated by a coupling reaction with an oxidation product of an aromatic primary amine developing agent, Za, Zb, and Zc each represents a methine group, a substituted methine group, =N— or —NH—, provided that one of the Za—Zb bond and the Zb—Zc bond is a double bond and the other is a single bond and, when Zb—Zc is a carbon-to-carbon double bond, it may be a part of an aromatic ring, and a dimer or higher polymer may be formed at $R_{11}$ or X, or, when Za, Zb or Zc represents a substituted methine group, a dimer or higher polymer may be formed at the substituted methine group.

It has been found, however, that magenta couplers of general formula (I) have the defect that, when processed with a conventional color developer, they show poor color-forming properties, a serious variation in photographic properties and, after being processed, are liable to cause magenta stain with time.

As to variation of photographic properties, it has been found that variations in the concentration of sulfite ion (conventionally added to a color developer) have a serious influence. Therefore, various preservatives or chelating agents have been added to color developers to keep the above-described concentration of sulfite ion at a constant level in a stable fashion. However, effective techniques have not yet been discovered. It has then been found that when sulfite ion is eliminated, the concentrations of hydroxylamines or color-developing agents vary so much that there also results a detrimental influence on photographic properties. Therefore, preservatives for replacing sulfite ion are necessary. However, the addition of triethanolamines described in U.S. Pat. No. 4,170,478 and poly(ethyleneimines) described in U.S. Pat. No. 4,252,892 have failed to provide sufficient results.

On the other hand, as to formation of magenta stain caused after processing, conventional anti-fading techniques or stain-preventing techniques (anti-fading techniques include adding various compounds such as hydroquinone derivatives described in, for example, U.S. Pat. Nos. 2,360,290, 2,418,613, 2,675,314, 2,701,197, 2,704,713, 2,728,659, 2,732,300, 2,735,765, 2,710,801, and 2,816,028, British Pat. No. 1,363,921, and JP-A No. 58-24141, gallic acid derivatives described in U.S. Pat. Nos. 3,457,079 and 3,069,262, p-alkoxyphenols described in U.S. Pat. Nos. 2,735,765, and 3,698,909, JP-B No. 49-20977 (the term "JP-B" as used herein means an "examined Japanese patent publication") and JP-B No. 52-6623, p-hydroxyphenol derivatives described in U.S. Pat. Nos. 3,432,300, 3,573,050, 3,574,627 and 3,764,337, JP-A No. 52-35633, JP-A No. 52-147434 and JP-A No. 52-152225, and bisphenols described in U.S. Pat. No. 3,700,455; and the stain-preventing techniques described in, for example, JP-A No. 49-11330, JP-A No. 50-57223, JP-A No. 56-85747, and JP-B No. 56-8346) have failed to provide sufficient results.

As is described above, it has been desired to develop a technique of overcoming the defects of magenta couplers represented by general formula (I).

SUMMARY OF THE INVENTION

As a result of intensive studies, the inventors have found that the objects of the present invention can effectively be attained by employing the following technique. That is, the above-described problems can be solved by a method for processing a silver halide color photographic material, which comprises processing a silver halide light-sensitive material containing at least one pyrazoloazole type magenta coupler represented by following general formula (I), after imagewise exposure, with a color developer containing an aromatic primary amine color developing agent and at least one member selected from among hydrazines and hydrazides represented by following general formula (II):

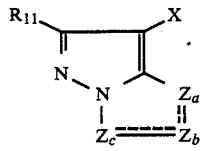

(I)

wherein $R_{11}$ represents a hydrogen atom Or a substituent, X represents a hydrogen atom or a group capable of being eliminated by a coupling reaction with an oxidation product of an aromatic primary amine developing agent, Za, Zb, and Zc each represents a methine group, a substituted methine group, =N— or —NH—, provided that one of the Za—Zb bond and the Zb—Zc bond is a double bond and the other is a single bond and, when Zb—Zc is a carbon-to-carbon double bond, it may be a part of an aromatic ring, and a dimer or higher polymer may be formed at $R_{11}$ or X, or, when Za, Zb or Zc represents a substituted methine group, a dimer or higher polymer may be formed at the substituted methine group;

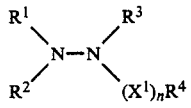

(II)

wherein $R^1$, $R^2$ and $R^3$ each independently represents a hydrogen atom, an alkyl group, an aryl group or a heterocyclic group, $R^4$ represents a hydrogen atom, hydroxy group, a hydrazino group, an alkyl group, an aryl group, a heterocyclic group, an alkoxy group, an aryloxy group, a carbomoyl group or an amino group, $X^1$ represents a divalent group, and n represents 0 or 1, provided that, when n is 0, $R^4$ represents an alkyl group, an aryl group or a heterocyclic group, and $R^3$ and $R^4$ may together form a heterocyclic ring.

DETAILED DESCRIPTION OF THE INVENTION

Particularly, it was not expected that the above-described defects with the couplers of general formula (I) could be removed by processing with a color developer containing the compound represented by general formula (II) (that is, at least one member selected from among hydrazines and hydrazides) which does not substantially contain benzyl alcohol.

Magenta couplers represented by general formula (I) are described in detail below.

In general formula (I), the term "polymer" means one which contains two or more groups represented by general formula (I) per molecule, and the polymer includes bis derivatives and polymer couplers. The polymer coupler may be a homopolymer composed of only monomers (preferably those containing a vinyl group, which are hereinafter referred to as "vinyl monomers") having the moiety represented by general formula (I) or a copolymer with a non-color forming, ethylenic monomer not coupling with an oxidation product of an aromatic amine developing agent.

The compounds represented by general formula (I) are 5-membered ring/5-membered ring condensation type nitrogen-containing heterocyclic couplers, whose color-forming matrix nucleus shows an aromaticity electronically equal to naphthalene and has a chemical structure usually given a generic name of azapentalene. Of the couplers represented by general formula (I), preferable couplers are 1H-imidazo-(1,2-b)pyrazoles, 1H-pyrazolo(1,5-b)pyrazoles, 1 H-pyrazolo(5,1-c)(1,2,4-triazoles, 1H-pyrazolo(1,5-b)(1,2,4)triazoles, 1H-pyrazolo(1,5-d)tetrazoles, and 1H-pyrazolo(1,5-a)benzimidazoles, which are respectively represented by the following general formulae (Ia), (Ib), (Ic), (Id), (Ie) and (If). Of these, compounds represented by (Ia), (Ic) and (Id) are particularly preferable, with (Id) being more particularly preferable.

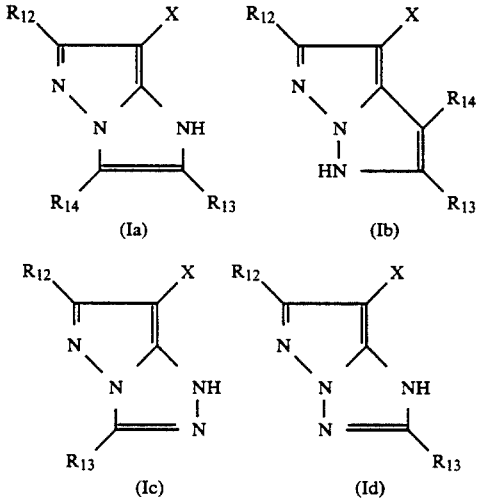

-continued

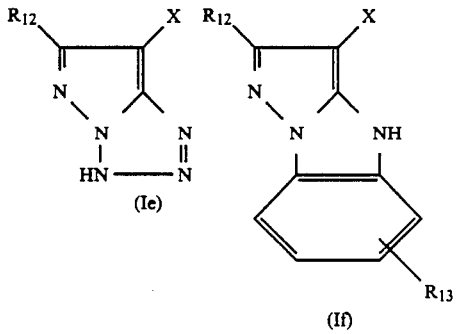

In general formulae (Ia) to (If), $R_{12}$, $R_{13}$ and $R_{14}$ each independently represents a hydrogen atom, a halogen atom, an alkyl group, an aryl group, a heterocyclic group, a cyano group, an alkoxy group, an aryloxy group, a heterocyclic oxy group, an acyloxy group, a carbomoyloxy group, a silyloxy group, a sulfonyloxy group, an acylamino group, an anilino group, a ureido group, an imido group, a sulfamoylamino group, a carbomoylamino group, an alkylthio group, an arylthio group, a heterocyclic thio group, an alkoxycarbonylamino group, an aryloxycarbonylamino group, a sulfonamido group, a carbomoyl group, an acyl group, a sulfamoyl group, a sulfonyl group, a sulfinyl group, an alkoxycarbonyl group, or an aryloxycarbonyl group, and X represents a hydrogen atom, a halogen atom, a carboxy group or a coupling-off group bound to the carbon atom at the coupling site through an oxygen atom, a nitrogen atom or a sulfur atom. Further, $R_{12}$, $R_{13}$, $R_{14}$ or X may be a divalent group to form a bis derivative. When the moiety represented by general formula (Ia) to (If) constitutes a part of a vinyl monomer, $R_{12}$, $R_{13}$ or $R_{14}$ represents a single bond or a linking group through which the moiety represented by general formula (Ia) to (If) is bound to the vinyl group.

More particularly, $R_{12}$, $R_{13}$ and $R_{14}$ each represents a hydrogen atom, a halogen atom (for example chlorine or bromine), an alkyl group (for example, methyl, propyl, i-propyl, t-butyl, trifluoromethyl, tridecyl, 3-(2,4-di-tamylphenoxy)propyl, 2-dodecyloxyethyl, 3-phenoxypropyl, 2-hexylsulfonyl-ethyl, cyclopentyl or benzyl), an aryl group (for example, phenyl, 4-t-butylphenyl, 2,4-di-t-amylphenyl, 4-tetradecanamidophenyl), a heterocyclic group (for example, 2-furyl, 2-thienyl, 2-pyrimidinyl or 2-benzothiazolyl), a cyano group, an alkoxy group (for example, methoxy, ethoxy, 2-methoxyethoxy, 2-dodecyloxyethoxy, 2 -phenoxyethoxy or 2-methanesulfonylethoxy), an aryloxy group (for example, phenoxy, 2-methylphenoxy or 4-t-butylphenoxy), a heterocyclic oxy group (for example, 2-benzimidazolyloxy), an acyloxy group (for example, acetoxy or hexadecanoyloxy), a carbamoyloxy group (for example, N-phenylcarbamoyloxy or N-ethylcarbomoyloxy), a silyloxy group (for example, trimethylsilyloxy), a sulfonyloxy group (for example, dodecylsulfonyloxy), an acylamino group (for example, acetamido, benzamido, tetradecanamido, α-(2,4-di-t-amylphenoxy)butylamido, γ-(3-t-butyl-4-hydroxyphenoxy)butylamido or α-{4-(4-hydroxyphenylsulfonyl)phenoxy}decanamido), an anilino group (for example, phenylamino, 2-chloroanilino, 2-chloro 5-tetradecanamidoanilino, 2-chloro-5-dodecyloxycarbonylanilino, N-acetylanilino or 2-chloro-5-{α-(3-t-butyl-4-hydroxyphenoxy)dodecanamido}anilino), a ureido group (for example, phenylureido, N-butyl-N'-methylureido, methylureido or N,N-dibutylureido), an imido group (for example, N-succinimido, 3-benzylhydantoinyl, 4-(2-ethylhexanoylamino)phthalimido), a sulfamoylamino group (for example, N,N-dipropylsulfamoylamino or N-methyl-N-decylsulfamoylamino), a carbamoylamino group (for example, carbamoylamino, or N,N-dimethylcarbamoylamino), an alkylthio group (for example, methylthio, octylthio, tetradecylthio, 2-phenoxyethylthio, 3-phenoxypropylthio, 3-(4-t-butylphenoxy)propylthio), an arylthio group (for example, phenylthio, 2-butoxy-5-t-octylphenylthio, 3-pentadecylphenylthio, 2-carboxyphenylthio or 4-tetradecanamidophenylthio), a heterocyclic thio group (for example, 2-benzothiazolylthio), an alkoxycarbonylamino group (for example, methoxycarbonylamino or tetradecyloxycarbonylamino), an aryloxycarbonylamino group (for example, phenoxycarbonylamino or 2,4-di-tert-butylphenoxycarbonylamino), a sulfonamido group (for example, methanesulfonamido, hexadecanesulfonamido, benzenesulfonamido, p-toluenesulfonamido, octadecanesulfonamido or 2-methyloxy-5-t-butylbenzenesulfonamido), a carbamoyl group (for example, N-ethylcarbamoyl, N,N-dibutylcarbamoyl, (2-dodecyloxyethyl)carbamoyl, N-methyl-N-dodecylcarbamoyl or N-{3-(2,4-di-tert-amylphenoxy)propyl}carbamoyl), an acyl group (for example, acetyl, (2,4-di-tertamylphenoxy)-acetyl or benzoyl), a sulfamoyl group (for example, N-ethylsulfamoyl group, N,N-dipropylsulfamoyl, N-(2-dodecyloxyethyl)-sulfamoyl, N-ethyl-N-dodecylsulfamoyl or N,N-diethylsulfamoyl), a sulfonyl group (for example, methanesulfonyl, octanesulfonyl, benzenesulfonyl or toluenesulfonyl), a sulfinyl group (for example, octanesulfinyl, dodecylsulfinyl or phenylsulfinyl), an alkoxycarbonyl group (for example, methoxycarbonyl, butyloxycarbonyl, dodecyloxycarbonyl or octadecyloxycarbonyl) or an aryloxycarbonyl group (for example, phenyloxycarbonyl or 3-pentadecylphenyloxy-carbonyl).

X represents a hydrogen atom, a halogen atom (for example, chlorine, bromine or iodine), a carboxyl group or a group bound through an oxygen atom (for example, acetoxy, prapanoyloxy, benzoyloxy, 2,4-dichlorobenzoyloxy, ethoxyoxaloyloxy, pyruvinyloxy, cinnamoyloxy, phenoxy, cyanophenoxy, 4-methanesulfonamidophenoxy, 4-methanesulfonylphenoxy, α-naphthoxy, 3-pentadecylphenoxy, benzyloxycarbonyloxy, ethoxy, 2-cyanoethoxy, benzyloxy, phenethyloxy, 2-phenoxyethoxy, 5-phenyltetrazolyloxy, or 2-benzothiazolyloxy), a group bound through a nitrogen atom (for example, benzenesulfonamido, N-ethyltoluenesulfonamido, heptafluorobutanamido, 2,3,4,5,6-pentafluorobenzamido, octanesulfonamido, p-cyanophenylureido, N,N-diethylsulfamoylamino, 1-piperidyl, dimethyl-2,4-dioxo-3-oxazolidinyl, 1-benzyl-ethoxy-3-hydantoinyl, 2N-1,1-dioxo-3(2H)-oxo-1,2-benzoisothiazolyl, 2-oxo-1,2-dihydro-1-pyridinyl, imidazolyl, pyrazolyl, 3,5-diethyl-1,2,4-triazol-1-yl, 5- or 6-bromobenzotriazol-1-yl, 5-methyl-1,2,3,4-triazol-1-yl, benzimidazolyl, 3-benzyl-1-hydantoinyl, 1-benzyl-5-hexadecyloxy-3-hydantoinyl, 5-methyl-1-tetrazolyl, 4-methoxyphenylazo, 4-pivaloylaminophenylazo, 2-hydroxy-4-propanoylphenylazo) or a group bound through a sulfur atom (for example, phenylthio, 2-carboxyphenylthio, 2-butoxy-5-t-octylphenylthio, 4-methanesulfonamidophenylthio, 2,5-dibutoxyphenylthio, 4-methanesulfonylphenylthio, 4-octanesulfonamidophenylthio, 2-butoxyphenylthio, 4-dodecyloxyphenylthio, 2-(2-hexanesulfonylethyl)-5-tert-octylphenylthio, benzylthio, 2-cyanoethylthio, 1-ethoxycarbonyltridecylthio, 5-phenyl-2,3,4,5-tetrazolylthio, 2-benzothiazolylthio, 2-dodecylthio, 2-dodecylthio-5-thiophenylthio, 2-phenyl-3-dodecyl-1,2,4-triazolyl-5-thio).

In the case where $R_{12}$, $R_{13}$, $R_{14}$ or X is a divalent group to form a bis derivative, examples of the divalent group include a substituted or unsubstituted alkylene group (for example, methylene, ethylene, 1,10-decylene or $—CH_2CH_2—O—CH_2CH_2—$), a substituted or unsubstituted phenylene group (for example, 1,4-phenylene, 1,3-phenylene,

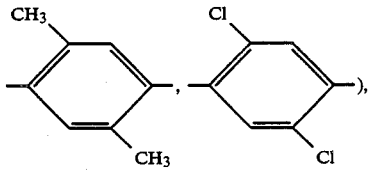

and $—NHCO—R_{15}—CONH—$ (wherein $R_{15}$ represents a substituted or unsubstituted alkylene or a substituted or unsubstituted phenylene group).

Examples of the linking group represented by $R_{12}$, $R_{13}$ and $R_{14}$ in the case where the moiety represented by general formula (Ia) to (If) constitutes a part of vinyl monomer include those which are formed by combining those selected from among an alkylene group (substituted or unsubstituted alkylene group of, for example, methylene, ethylene, 1,10-decylene or $—CH_2CH_2OCH_2CH_2—$), a phenylene group substituted or unsubstituted phenylene group of, for example, 1,4-phenylene, 1,3-phenylene,

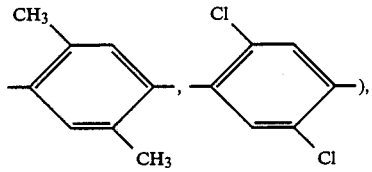

—NHCO—, —CONH—, —O—, —OCO— and an aralkylene group (for example,

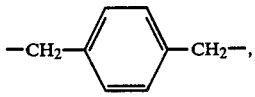

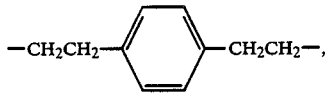

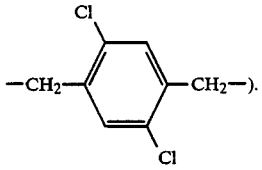

Additionally, the vinyl group of the vinyl monomer includes those which posses a substituent or substituents in addition to those represented by general formulae (Ia) to (If). Preferable substituents are a hydrogen atom, a chlorine atom or a lower alkyl group containing 1 to 4 carbon atoms.

As the non-color forming ethylenic monomers not coupling with an oxidation product of an aromatic primary amine developing agent, there are illustrated, for example, acrylic acid, α-chloroacrylic acid, alkylacrylic acid (e.g., methacrylic acid), esters or amides of these acrylic acids (for example, acrylamide, n-butylacrylamide, t-butylacrylamide, diacetoneacrylamide, methacrylamide, methyl acrylate, ethyl acrylate, n-propyl acrylate, n-butyl acrylate, t-butyl acrylate, iso-butyl acrylate, 2-ethylhexyl acrylate, n-octyl acrylate, lauryl acrylate, methyl methacrylate, ethyl methacryllate, n-butyl methacrylate and β-hydroxymethacrylate), methylenedibisacrylamide, vinyl esters (for example, vinyl acetate, vinyl propionate, and vinyl laurate), acrylonitrile, methacrylonitrile, aromatic vinyl compounds (for example, styrene and its derivatives, vinyltoluene, divinylbenzene, vinylacetophenone and sulfostyrene), itaconic acid, citraconic acid, crotonic acid, vinylidene chloride, vinyl alkyl ethers (for example, vinyl ethyl ether), maleic acid, maleic anhydride, maleic esters, N-vinyl-2-pyrrolidone, N-vinylpyridine and 2- and 4-vinylpyridine. Two or more of these non-color forming ethylenically unsaturated monomers may be used in combination.

Examples of the couplers represented by general formulae (Ia) to (If) and processes for synthesizing them are described in the literature shown below.

Compounds of general formula (Ia) are described in JP-A No. 59-162548, compounds of general formula (Ib) are described in JP-A No. 60-43659, compounds of general formula (Ic) are described in JP-B No. 47-27411, compounds of general formula (Id) are described in JP-A No. 59-171956 and JP-A No. 60-172982, compounds of general formula (Ie) are described in JP-A No. 60-33552, and compounds of general formula (If) are described in U.S. Pat. No. 3,061,432.

High color-forming ballast groups described in, for example, JP-A No. 58-42045, JP-A No. 59-214854, JP-A No. 59-177553, JP-A No. 59-177544 and JP-A No. 59-177557 may be substituted with any group of the above-described compounds of general formulae (Ia) to (If).

Specific examples of pyrazoloazole couplers used in the present invention are illustrated below, which, however, are not limitative.

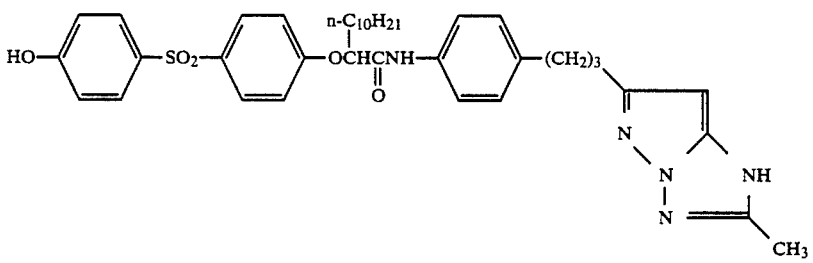

(M-1)

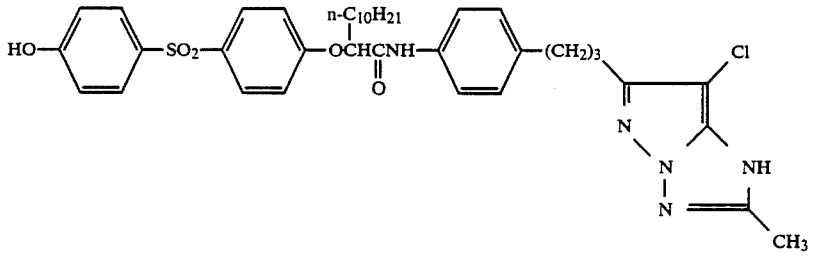

(M-2)

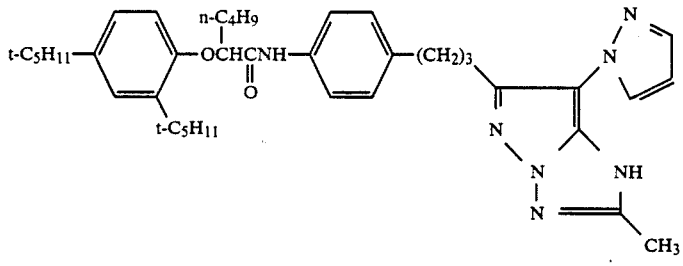

(M-3)

-continued
(M-4)
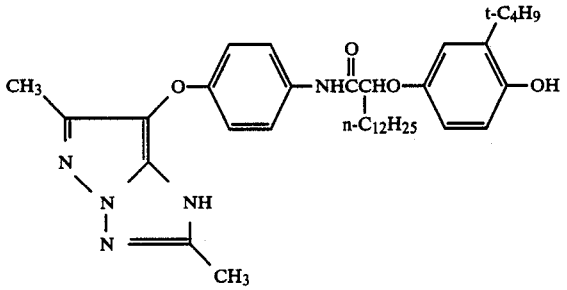
(M-5)
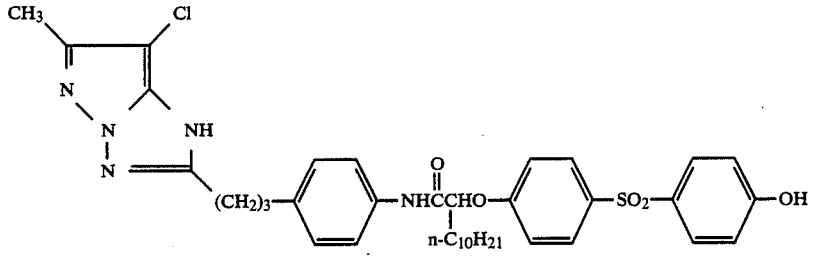
(M-6)
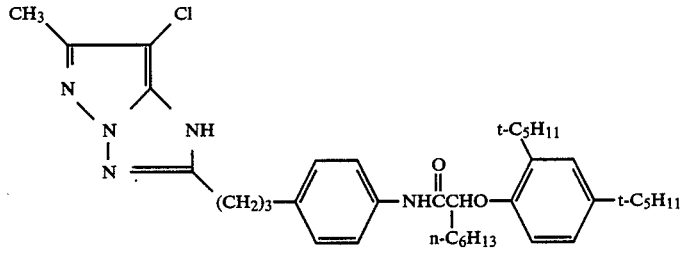
(M-7)
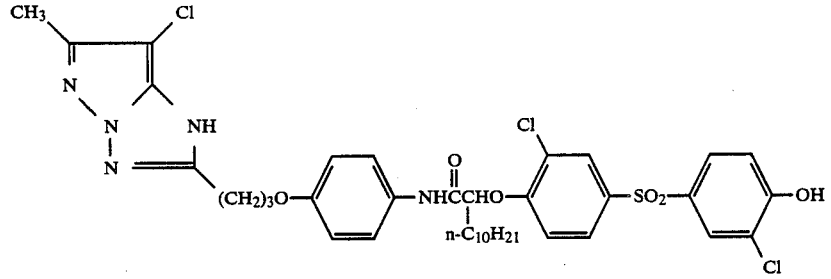
(M-8)
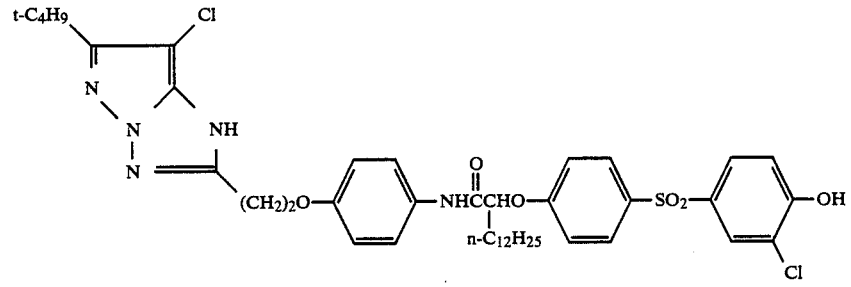

-continued
(M-9)
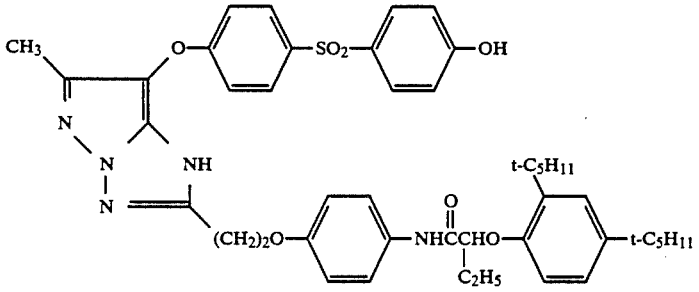
(M-10)
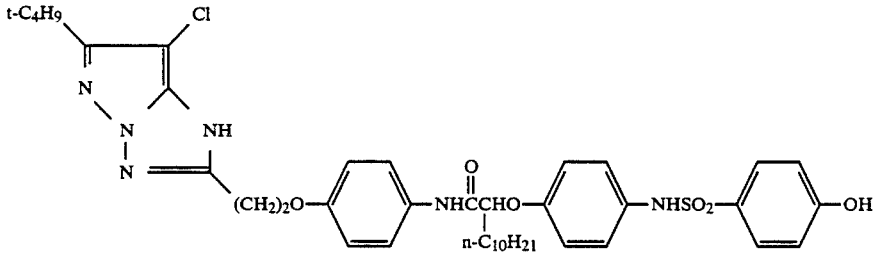
(M-11)
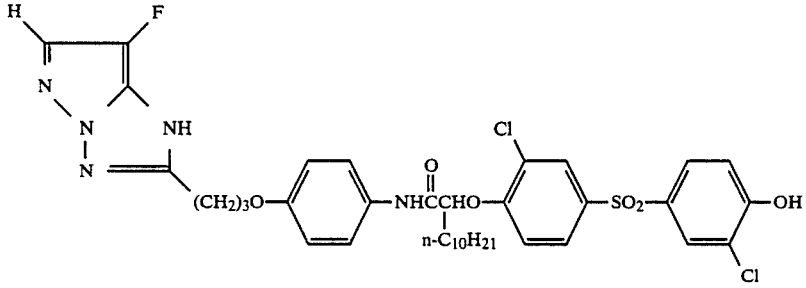
(M-12)
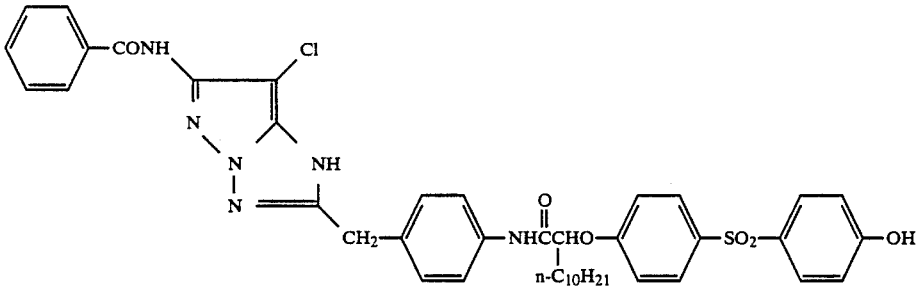
(M-13)
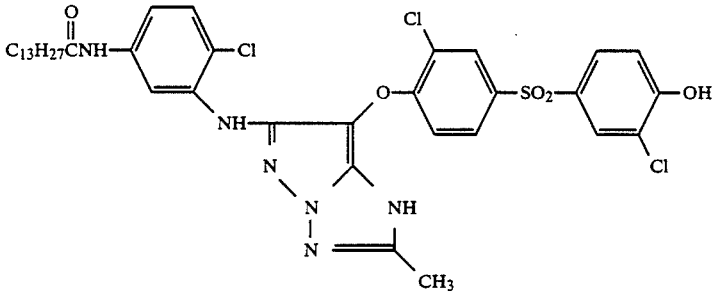

-continued
(M-14)
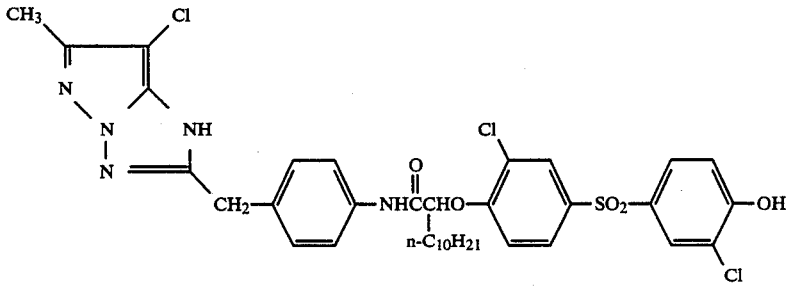
(M-15)
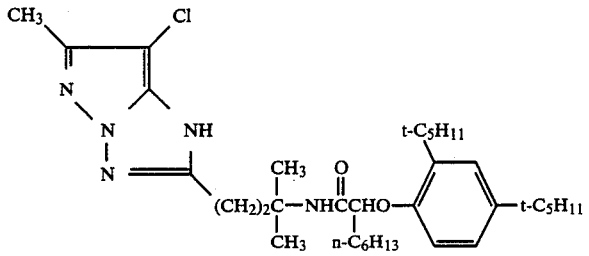
(M-16)
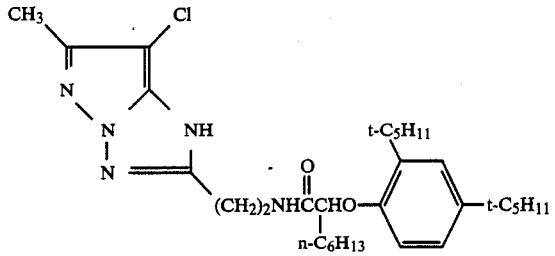
(M-17)
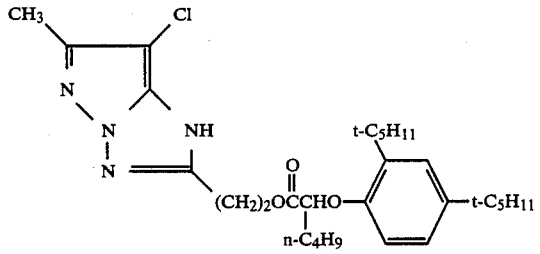
(M-18)
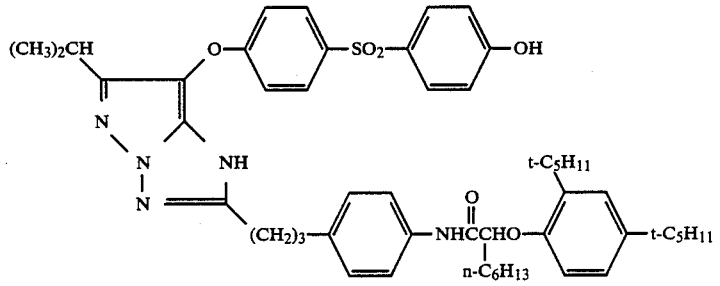
(M-19)
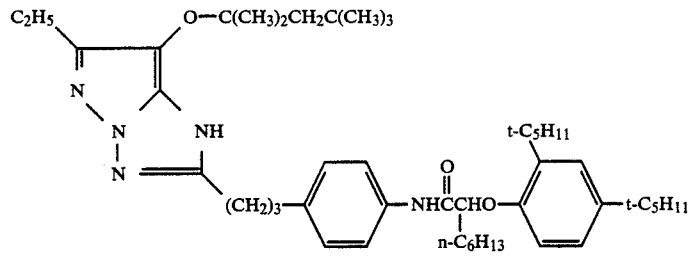

-continued
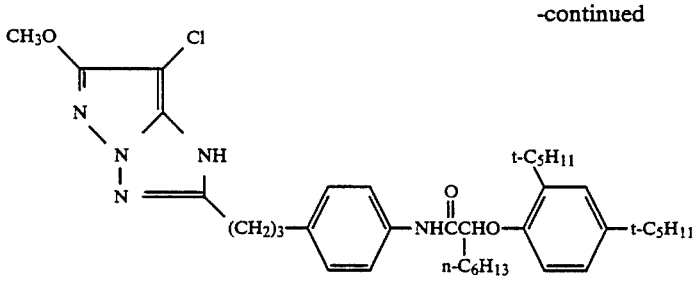
(M-20)
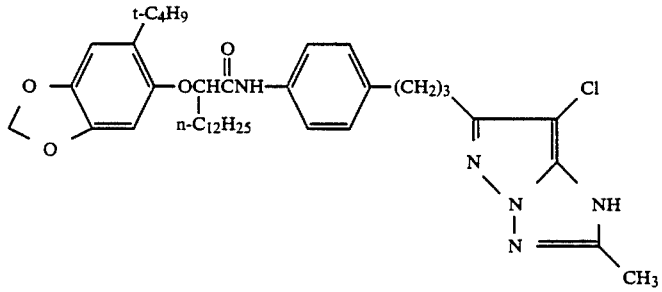
(M-21)
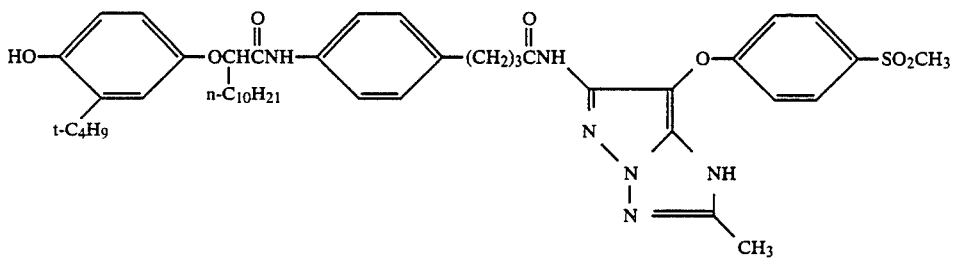
(M-22)
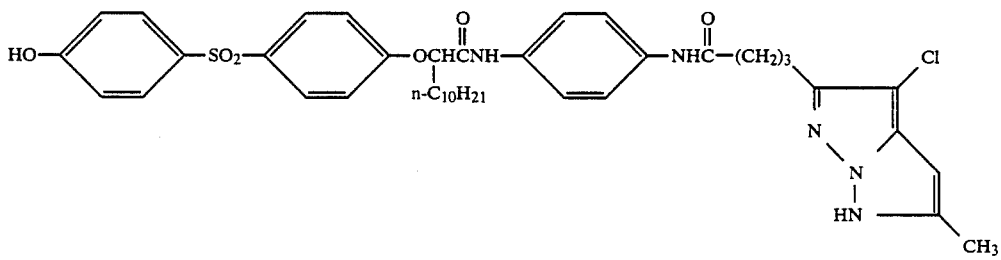
(M-23)
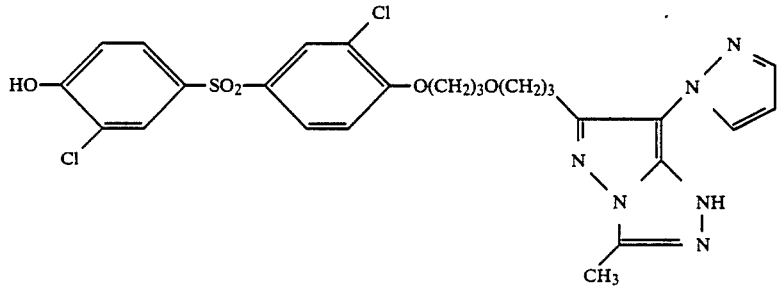
(M-24)
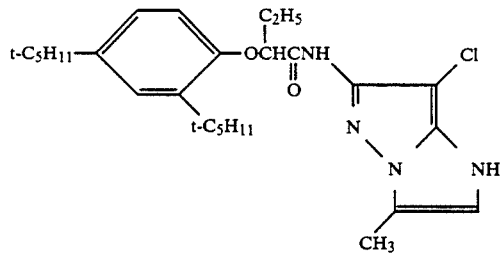
(M-25)

-continued
(M-26)
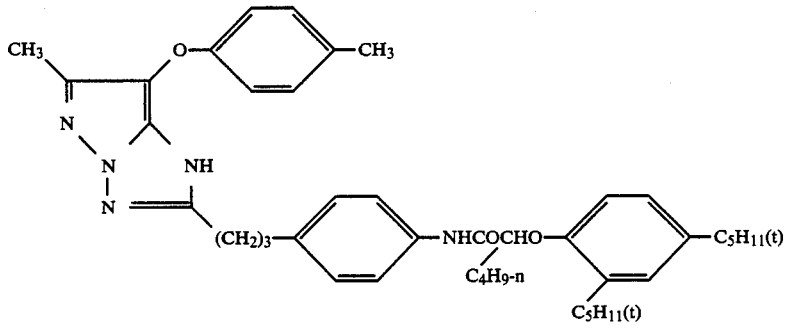
(M-27)
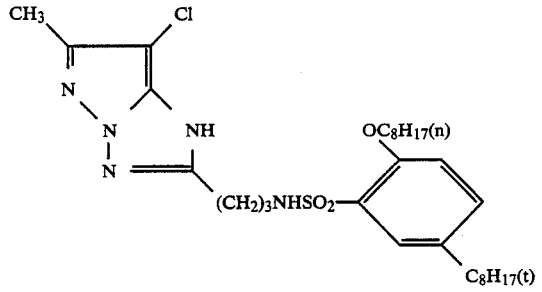
(M-28)
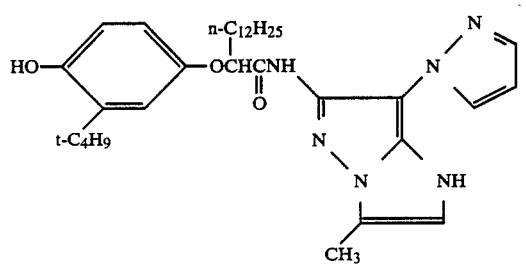
(M-29)
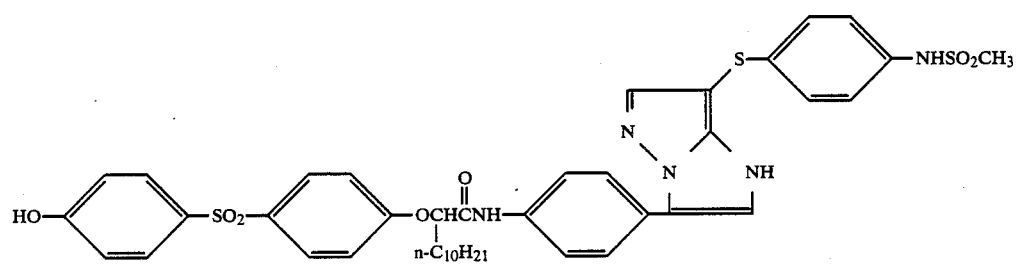
(M-30)
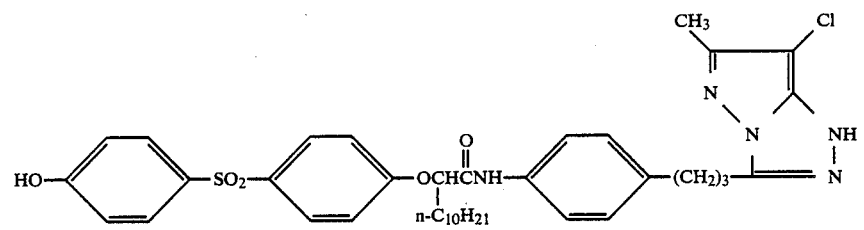

-continued
(M-31)
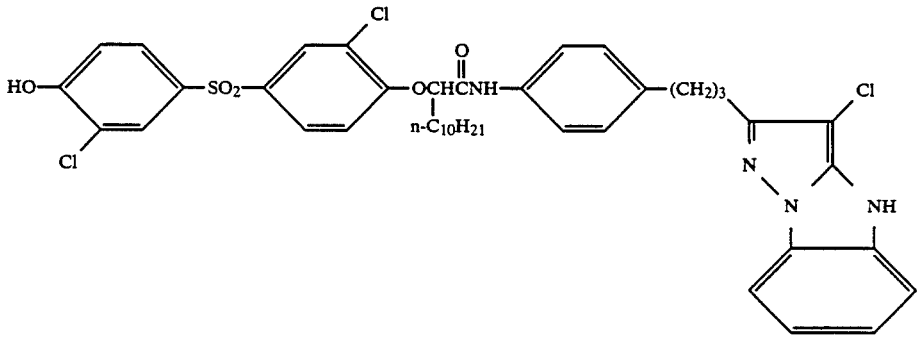
(M-32)
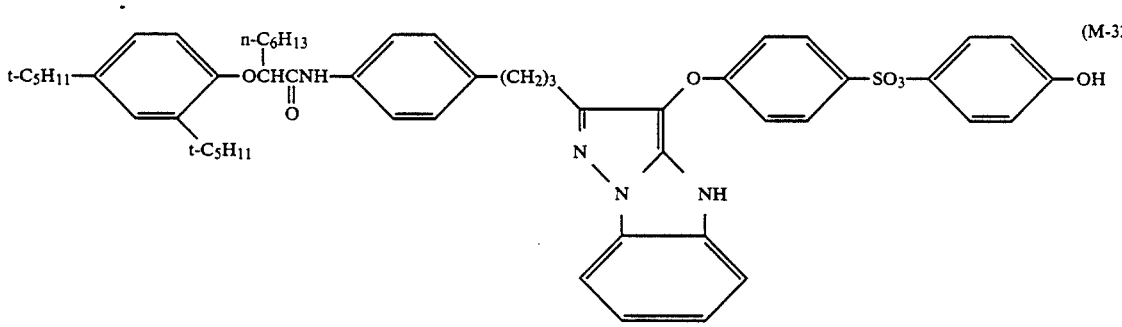
(M-33)
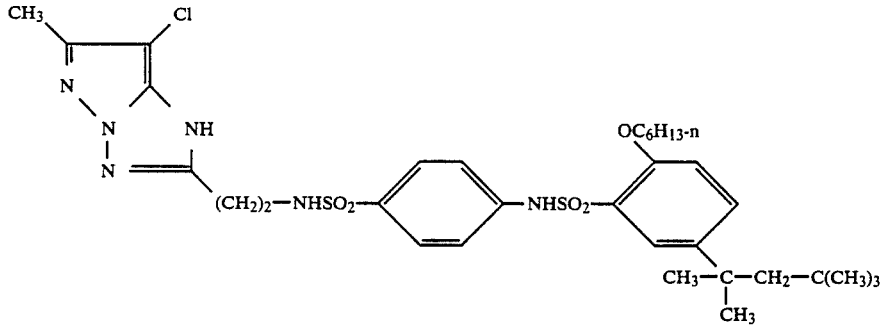
(M-34)
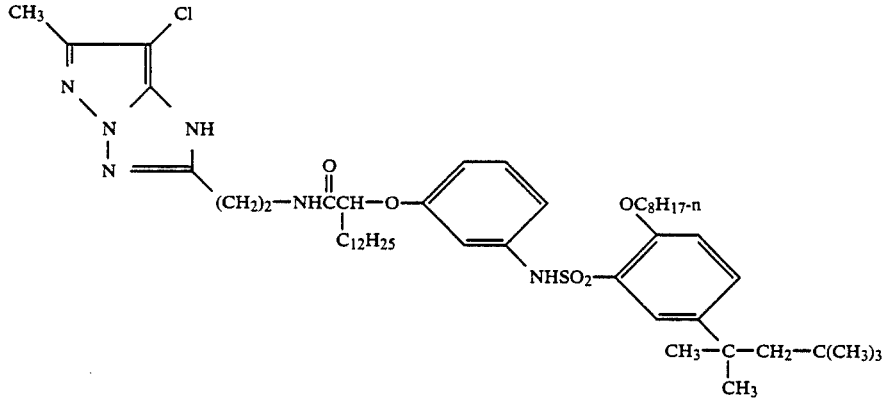

-continued
(M-35)
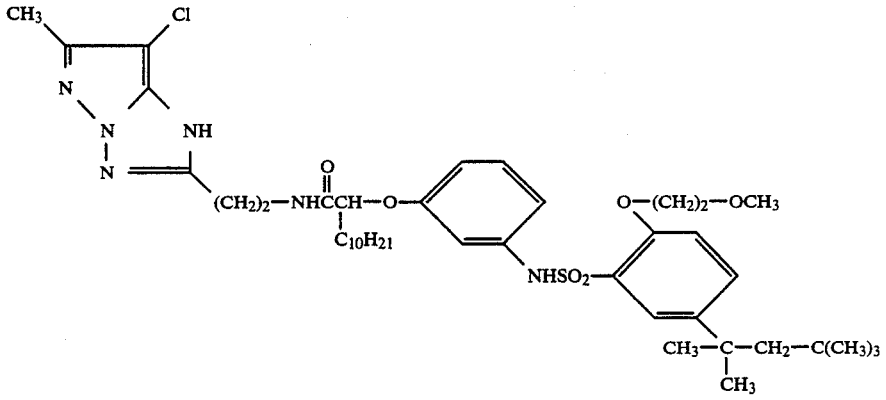
(M-36)
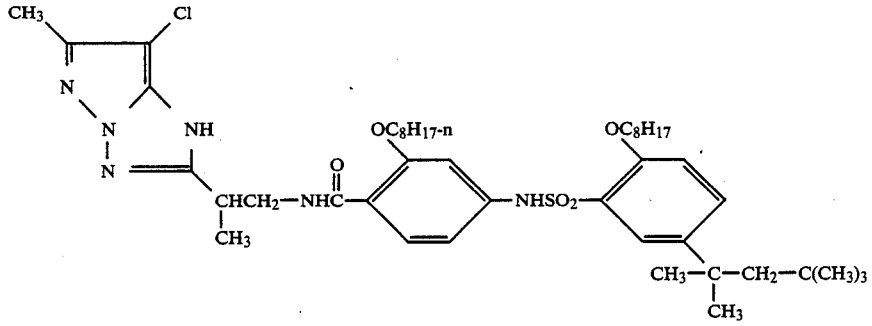
(M-37)
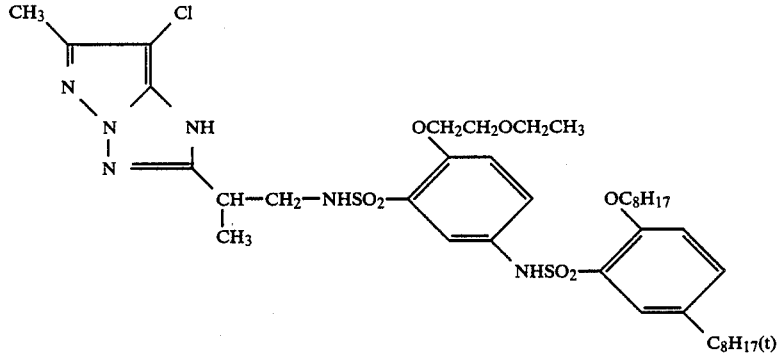
(M-38)
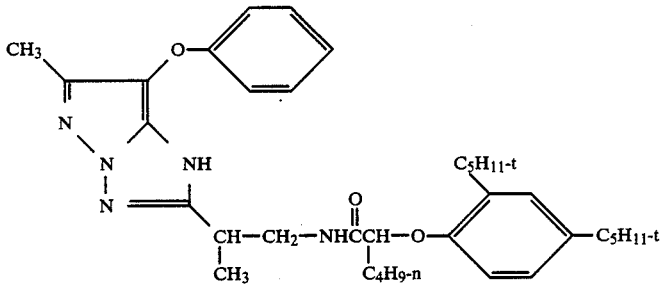

-continued
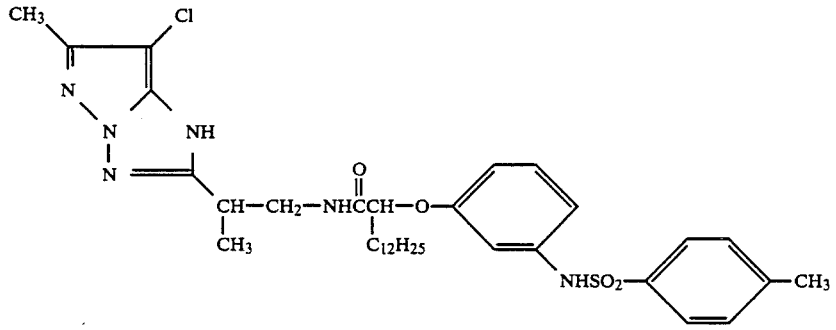
(M-39)
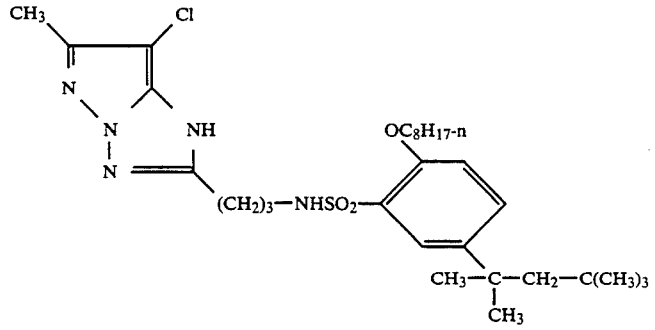
(M-40)
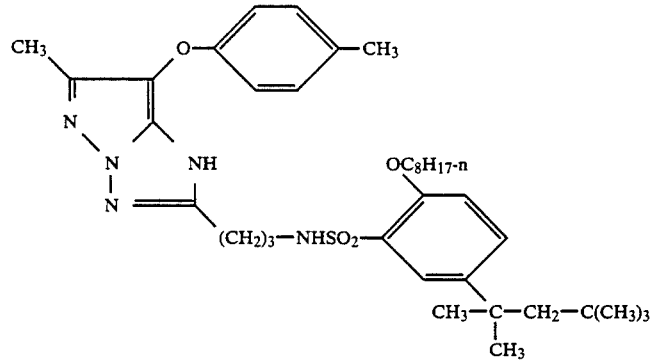
(M-41)
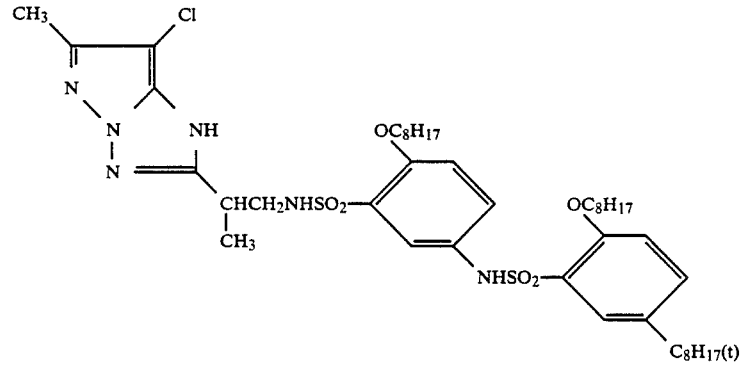
(M-42)

-continued
(M-43)
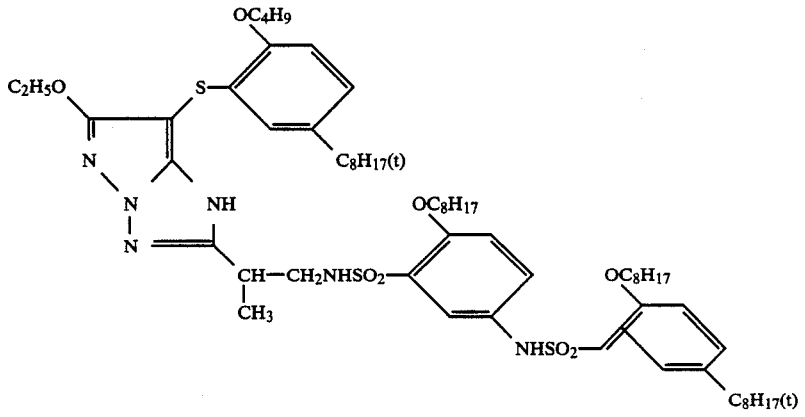
(M-44)
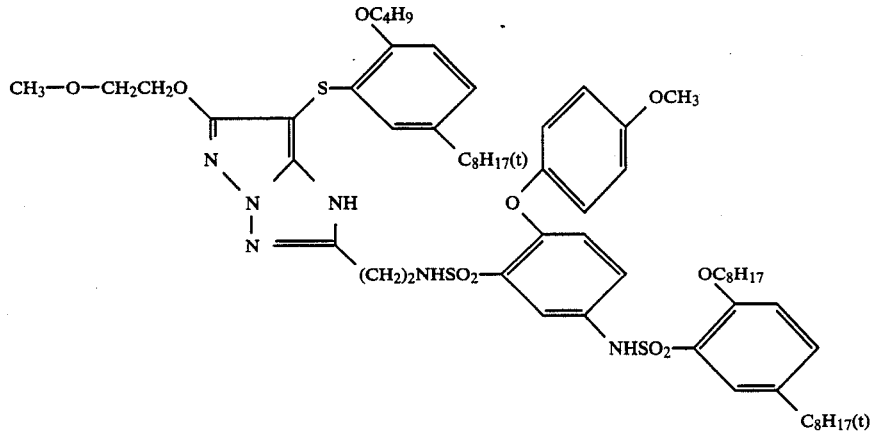
(M-45)
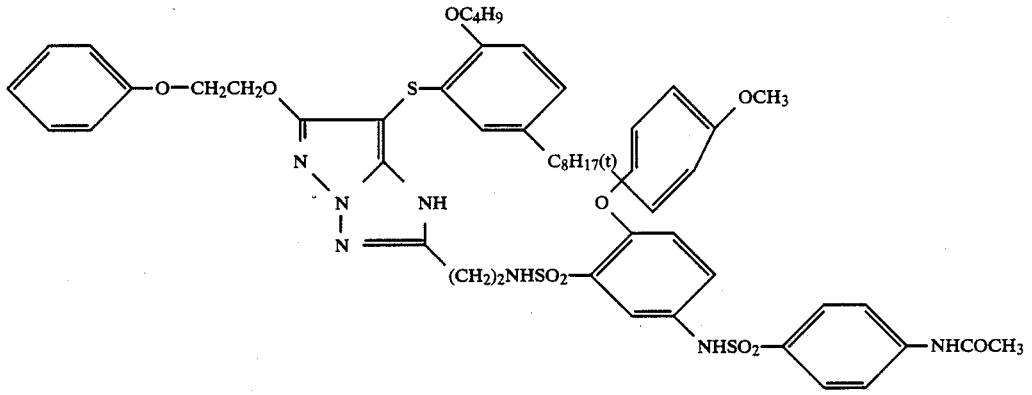
M-46)
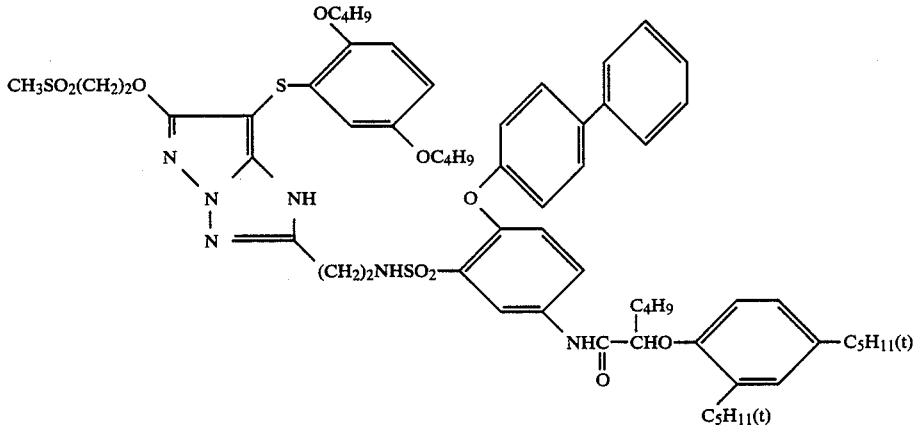

-continued
(M-47)
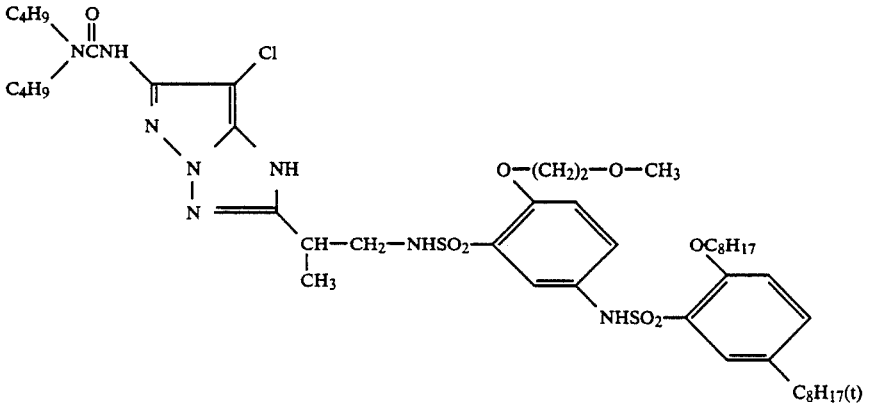
(M-48)
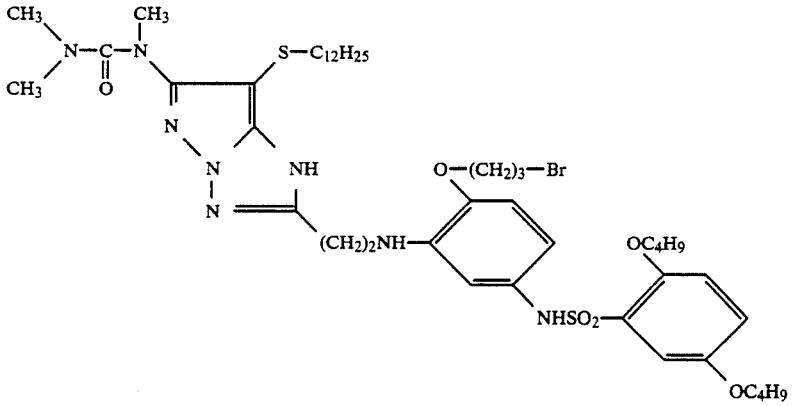
(M-49)
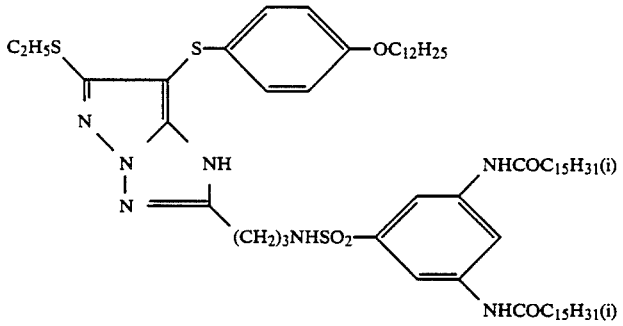
(M-50)
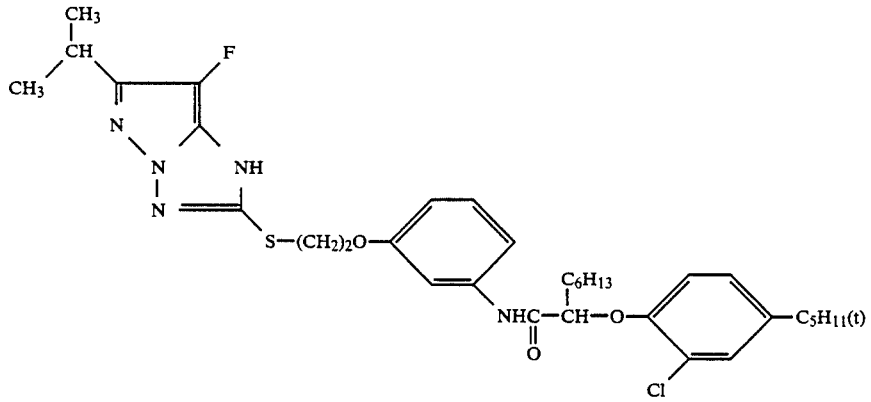

-continued
(M-51)
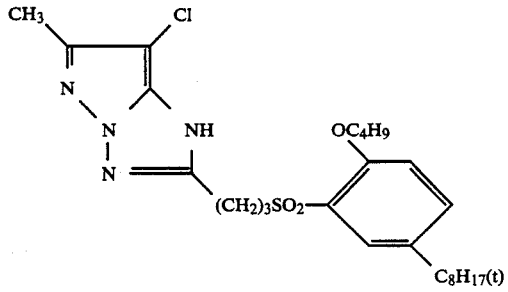
(M-52)
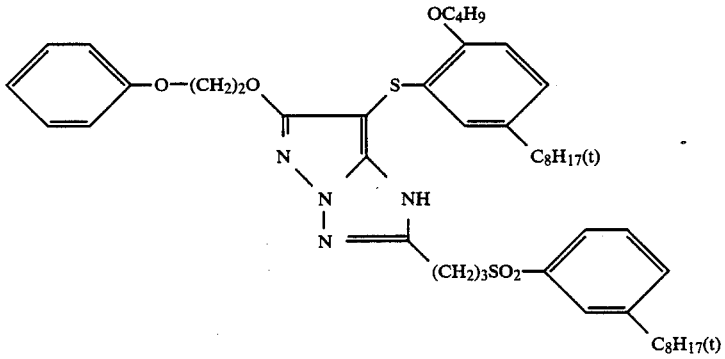
(M-53)
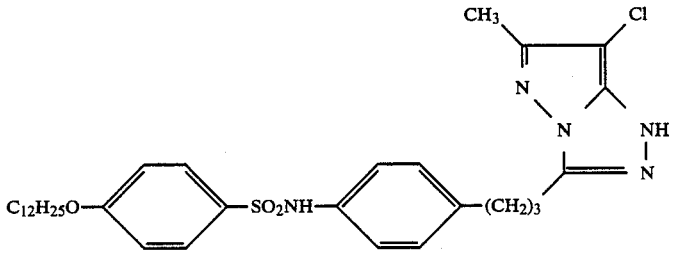
(M-54)
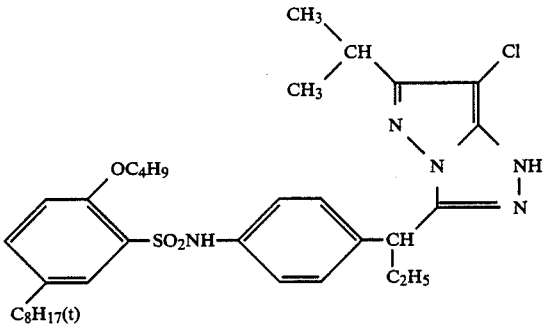
(M-55)
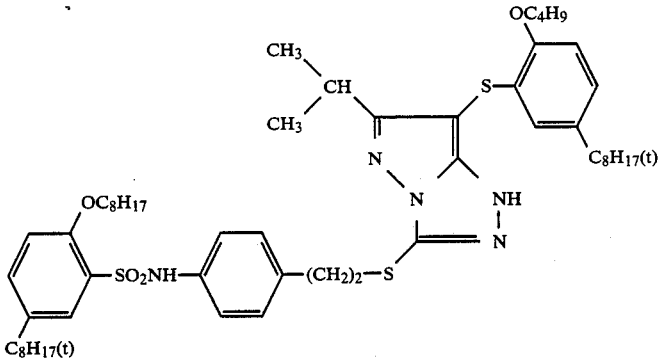

-continued
(M-56)
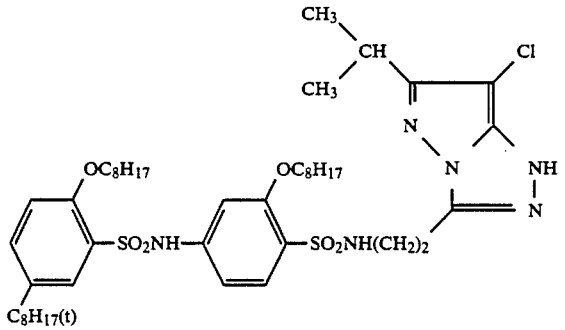
(M-57)
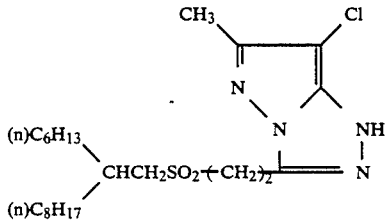
(M-58)
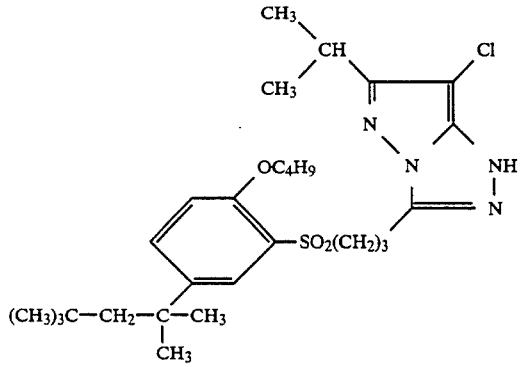
(M-59)
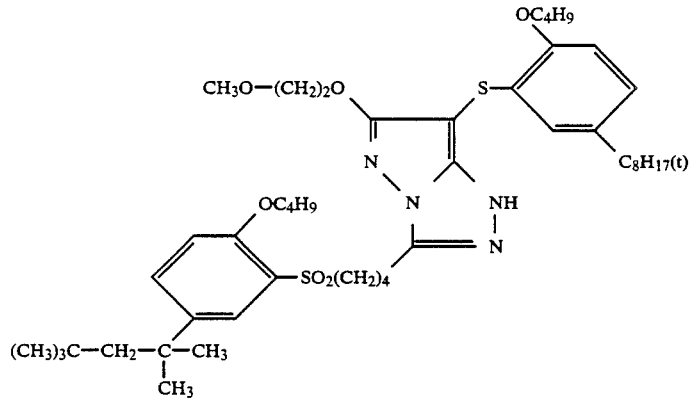
(M-60)
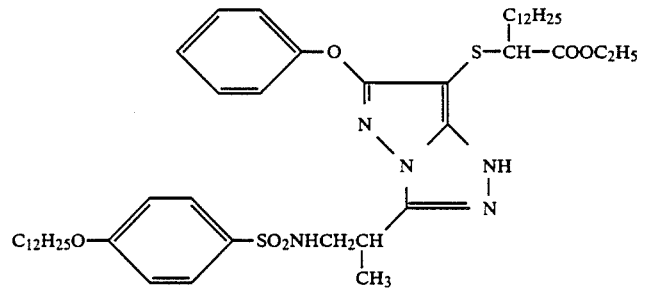

-continued
(M-61)
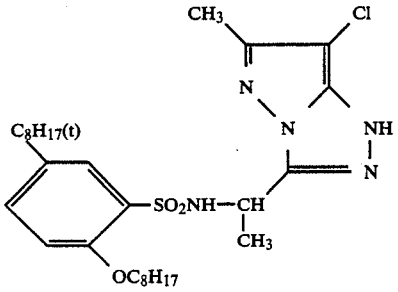
(M-62)
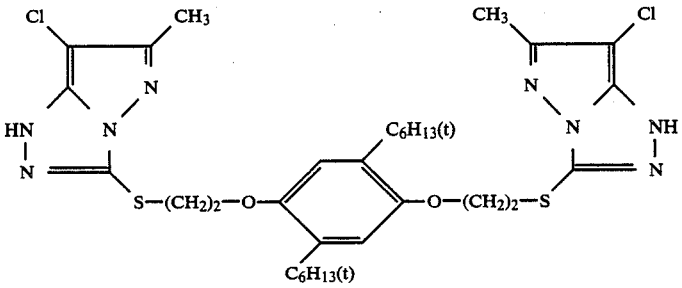
(M-63)
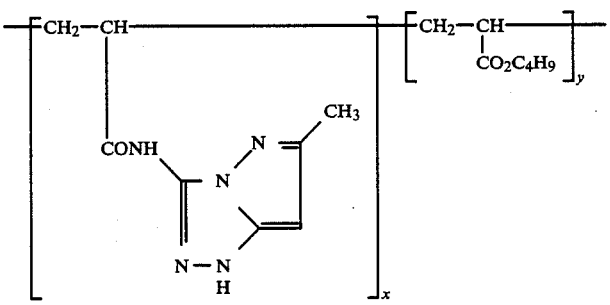
x:y = 50:50
(M-64)
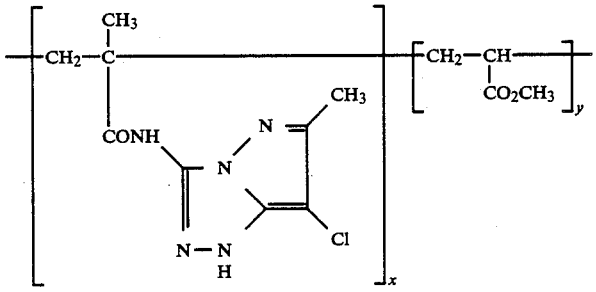
x:y = 40:60
(M-65)
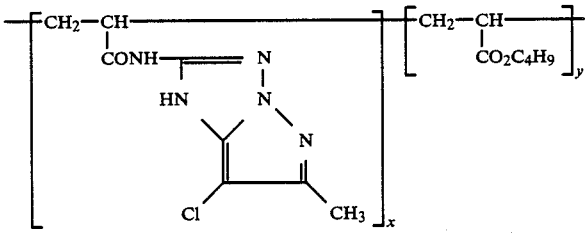
x:y = 50:50

-continued
(M-66)
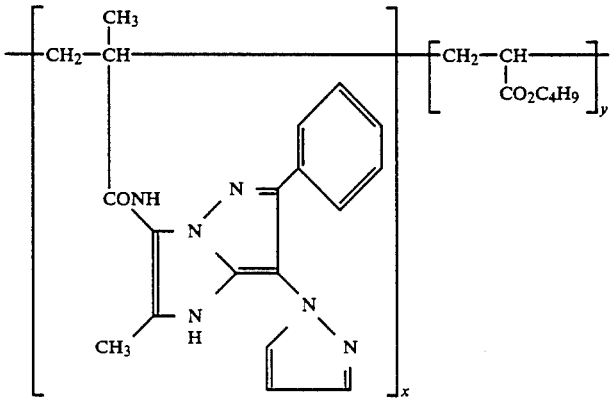
x:y = 55:45
(M-67)
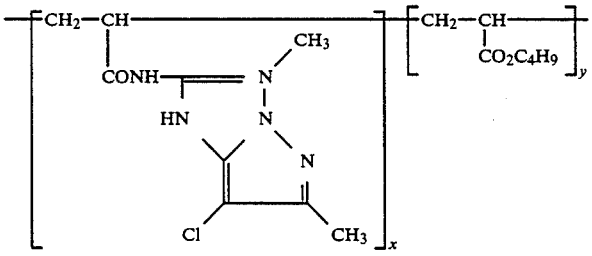
x:y = 50:50
(M-68)
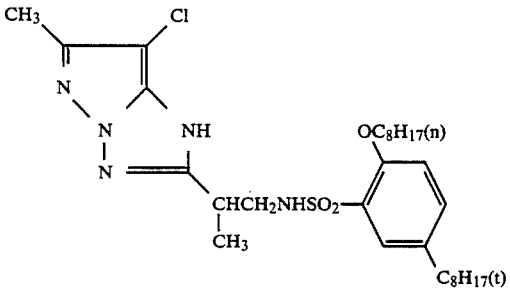
(M-69)
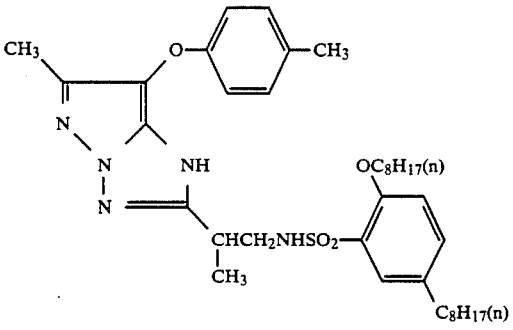

-continued
(M-70)
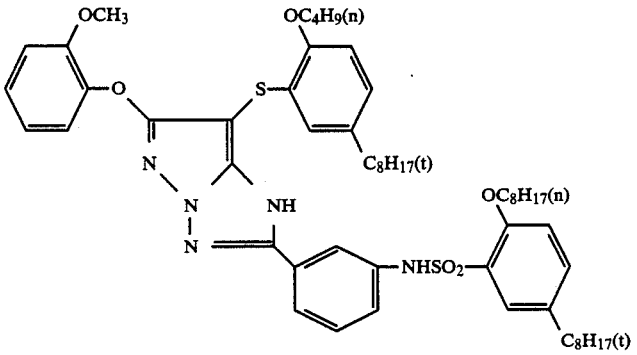
(M-71)
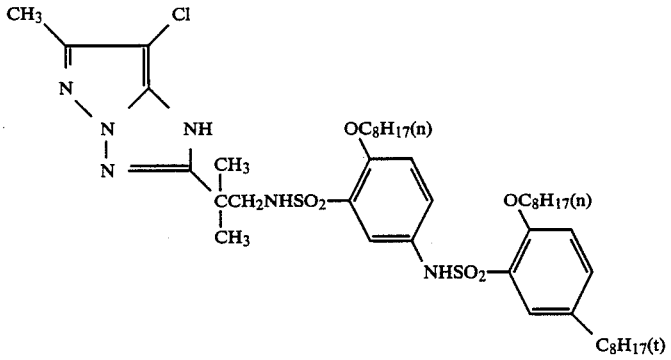
(M-72)
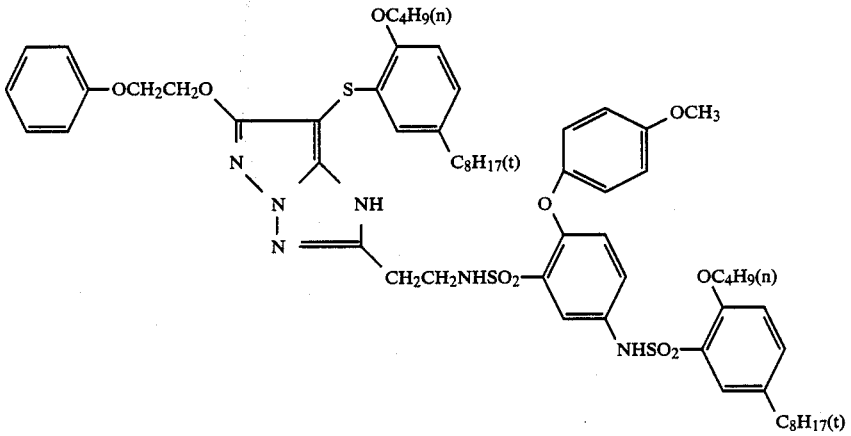
(M-73)
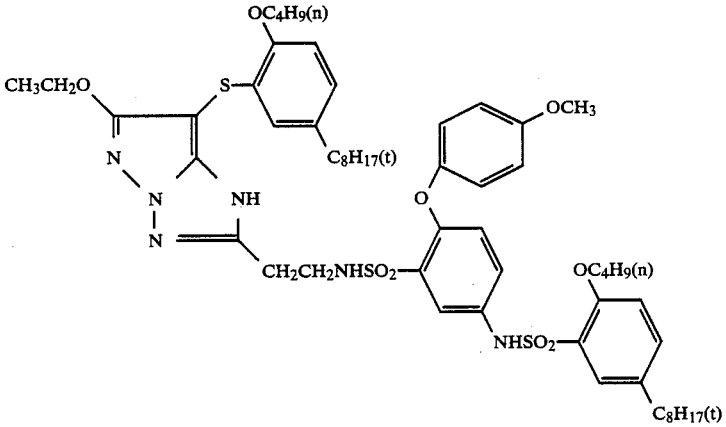

-continued
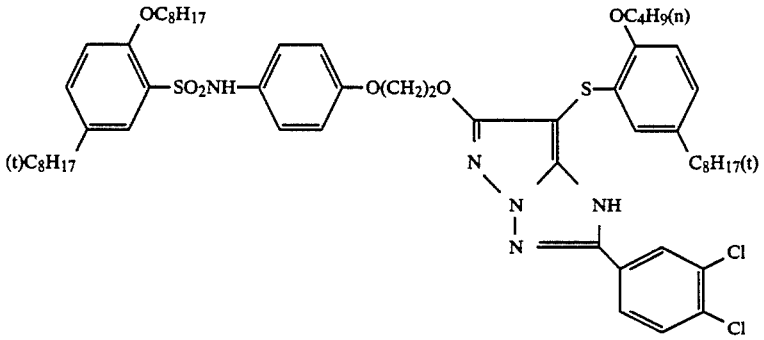
(M-74)
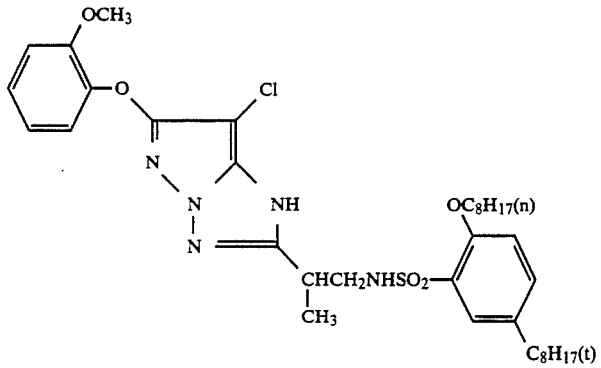
(M-75)
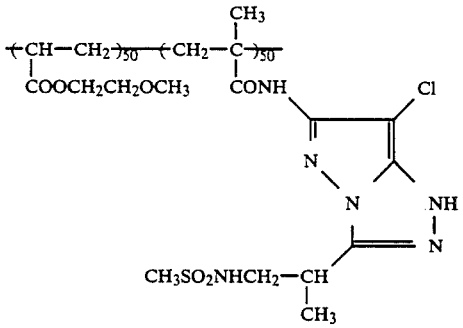
(M-76)
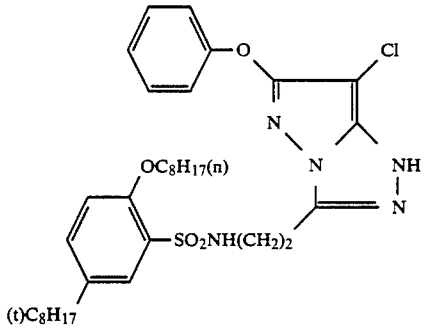
(M-77)

-continued
(M-78)
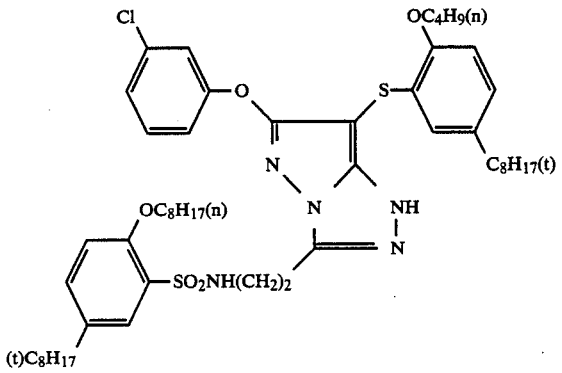
(M-79)
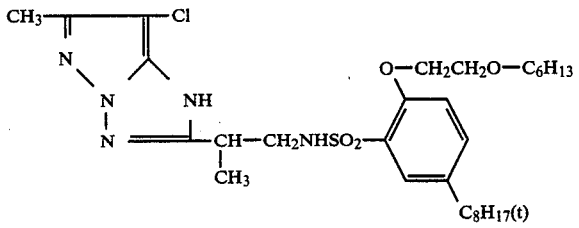
(M-80)
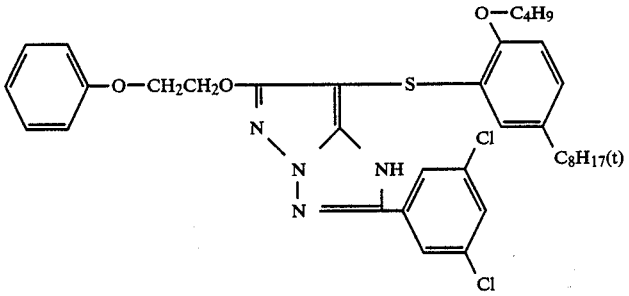
(M-81)
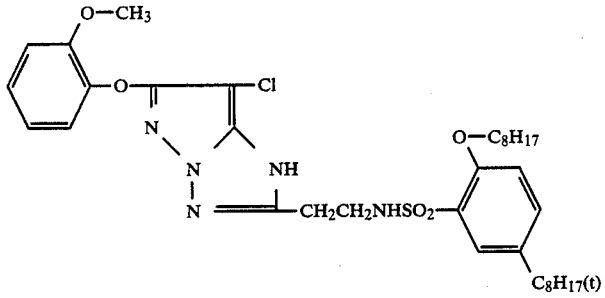
(M-82)
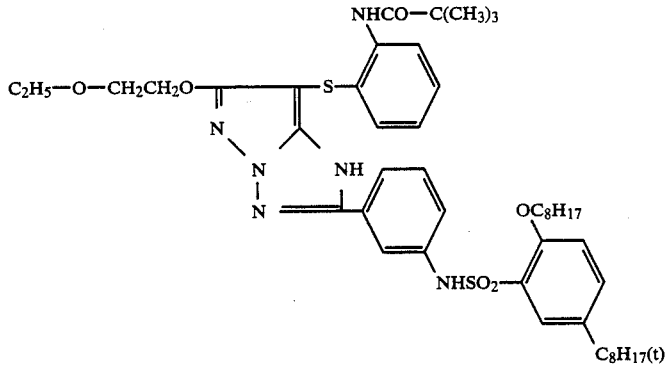

-continued (M-83)

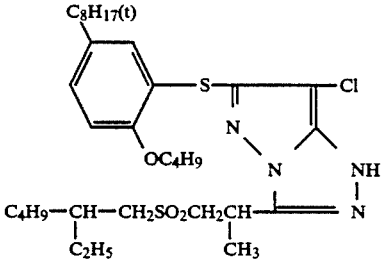

These couplers of general formula (I) are generally added to a silver halide emulsion layer in amounts of $2\times10^{-3}$ mol to $5\times10^{-1}$ mol, preferably $1\times10^{-2}$ mol to $5\times10^{-1}$ mol, per mol of silver in the emulsion layer.

In order to obtain satisfactory properties required for light-sensitive materials, two or more of the above-described couplers may be used together in one and the same layer, or one and the same compound may of course be added to two or more different layers.

Introduction of the couplers into silver halide emulsion layers may be conducted according to processed described in, for example, U.S. Pat. No. 2,322,027. For example, couplers are dissolved in an alkyl phthalate (for example, dibutyl phthalate or dioctyl phthalate), a phosphoric acid ester (for example, diphenyl phosphate, triphenyl phosphate, tricresyl phosphate, dioctyl butyl phosphate), a citric acid ester (for example, tributyl acetylcitrate), a benzoic acid ester (for example, octyl benzoate), an alkylamide (for example, diethyllaurylamide), an fatty acid ester (for example, dibutoxyethyl succinate or diethyl azelate), a trimesic acid ester (for example tributyl trimesate) or in an organic solvent having a boiling point of about 30° C. to about 150° C. (for example, a lower alkyl acetate such as ethyl acetate or butyl acetate, ethyl propionate, secbutyl alcohol, methyl isobutyl ketone, β-ethoxyethyl acetate or methylcellosolve acetate), then dispersed in a hydrophilic colloid. The above-described high-boiling organic solvent and the low-boiling organic solvent may be used as a mixture.

Compounds of general formula (II) to be used in the present invention, that is, hydrazine analogues composed of hydrazines and hydrazides, are described in detail below.

$R^1$, $R^2$ and $R^3$ each independently represents a hydrogen atom, a substituted or unsubstituted alkyl group (preferably containing 1 to 20 carbon atoms; for example, methyl, ethyl, sulfopropyl, carboxybutyl, hydroxyethyl, cyclohexyl, benzyl or phenethyl), a substituted or unsubstituted aryl group (preferably containing 6 to 20 carbon atoms; for example, phenyl, 2,5-dimethoxyphenyl, 4-hydroxyphenyl or 2-carboxyphenyl) or a substituted or unsubstituted heterocyclic group (preferably containing 1 to 20 carbon atoms and preferably being a 5- to 6-membered ring containing at least one of oxygen, nitrogen and sulfur as hetero atom; for example, pyridin-4-yl or N-acetylpiperidin-4-yl).

$R^4$ represents a hydrogen atom, a hydroxy group, a substituted or unsubstituted hydrazino group (for example, hydrazino, methylhydrazino or phenylhydrazino), a substituted or unsubstituted alkyl group (preferably containing 1 to 20 carbon atoms; for example, methyl, ethyl, sulfopropyl, carboxybutyl, hydroxyethyl, cyclohexyl, benzyl, t-butyl or n-octyl), a substituted or unsubstituted aryl group (preferably containing 6 to 20 carbon atoms; for example, phenyl, 2,5-dimethoxyphenyl, 4-hydroxyphenyl, 2-carboxyphenyl, 2-carboxyphenyl or 4-sulfophenyl), a substituted or unsubstituted heterocyclic group (preferably containing 1 to 20 carbon atoms and being preferably a 5- to 6-membered ring containing at least one of oxygen, nitrogen and sulfur as hetero atom; for example, pyridin-4-yl or imidazolyl), a substituted or unsubstituted alkoxy group (preferably containing 1 to 20 carbon atoms; for example, methoxy, ethoxy, methoxyethoxy, benzyloxy, cyclohexyloxy or octyloxy), a substituted or unsubstituted aryloxy group (preferably containing 6 to 20 carbon atoms; for example, phenoxy, p-methoxyphenoxy, p-carboxyphenyl or p-sulfophenoxy), a substituted or unsubstituted carbamoyl group (preferably containing 1 to 20 carbon atoms; for example, unsubstituted carbamoyl, N,N-diethylcarbamoyl or phenylcarbamoyl), or a substituted or unsubstituted amino group (preferably containing 0 to 20 carbon atoms; for example, amino, hydroxyamino, methylamino, hexylamino, methoxyethylamino, carboxyethylamino, sulfoethylamino, N-phenylamino or p-sulfophenylamino).

As further substituents for $R^1$, $R^2$, $R^3$ and $R^4$, a halogen atom (for example, chlorine or bromine), a hydroxy group, a carboxy group, a sulfo group, an amino group, an alkoxy group, an amido group, a sulfonamido group, a carbamoyl group, a sulfamoyl group, an alkyl group, an aryl group, an aryloxy group, an alkylthio group, an arylthio group, a nitro group, a cyano group, a sulfonyl group or a sulfinyl group are preferable, and these may further be substituted.

$X^1$ preferably represents a divalent organic residual group, and specifically represents, for example, —CO—, —$SO_2$— or $$-\overset{\overset{\displaystyle NH}{\|}}{C}-.$$

n represents 0 or 1, provided that, when n is 0, $R^4$ represents a group selected from among a substituted or unsubstituted alkyl, aryl and heterocyclic groups. $R^1$ and $R^2$, and $R^3$ and $R^4$ may optionally together form a heterocyclic group.

When n=0, at least one of $R^1$ to $R^4$ preferably represents a substituted or unsubstituted alkyl group. In particular, those compounds wherein $R^1$, $R^2$, $R^3$ and $R^4$ each represents a hydrogen atom or a substituted or unsubstituted alkyl group are preferable (provided that $R^1$, $R^2$, $R^3$ and $R^4$ do not all represent a hydrogen atom at the same time). Above all, those wherein $R^1$, $R^2$ and $R^3$ represent a hydrogen atom and $R^4$ a substituted or unsubstituted alkyl group; those wherein $R^1$ and $R^3$ represent a hydrogen atom, and $R^2$ and $R^4$ a substituted or unsubstituted alkyl group; or those wherein $R^1$and $R^2$ represent a hydrogen atom, and $R^3$ and $R^4$ a substituted or unsubstituted alkyl group ($R^3$ and $R^4$ optionally together forming a hetero ring).

When n is 1, $X^1$ preferably represents —CO—, $R^4$ preferably represents a substituted or unsubstituted amino group, and $R^1$ to $R^3$ each preferably represents a hydrogen atom or a substituted or unsubstituted alkyl group.

The alkyl group represented by $R^1$ to $R^4$ more preferably contains 1 to 10 carbon atoms, and most preferably 1 to 7 carbon atoms. Preferable substituents for the alkyl group include a hydroxy group, a carboxylic acid group, a sulfo group and a phosphonic acid group. When two or more substituents exist, they may be the same or different from each other.

The compounds represented by the general formula (II) may form a bis derivative, a tris derivative or a polymer bound through $R^1$, $R^2$, $R^3$ or $R^4$.

Examples of the compounds represented by general formula (II) are illustrated below which, however, are not limitative.

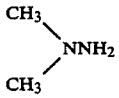
(II-1)

$CH_3NHNHCH_3$ (II-2)

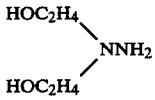
(II-3)

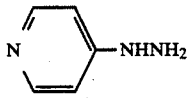
(II-4)

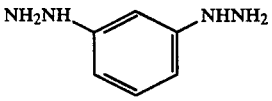
(II-5)

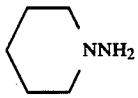
(II-6)

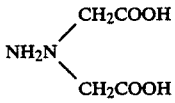
(II-7)

$HOOCCH_2NHNHCH_2COOH$ (II-8)

$NH_2NH(CH_2)_3NHNH_2$ (II-9)

$NH_2NHCH_2CH_2OH$ (II-10)

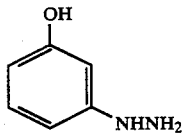
(II-11)

$NH_2NH—(CH_2)_3—SO_3H$ (II-12)

$NH_2NH—(CH_2)_4—SO_3H$ (II-13)

$NH_2NH—(CH_2)_3—COOH$ (II-14)

-continued

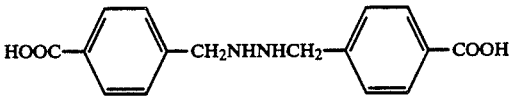
(II-15)

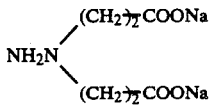
(II-16)

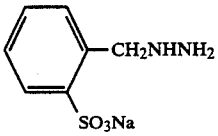
(II-17)

$NaOOCCH(CH_3)NHNHCH(CH_3)COONa$ (II-18)

$NH_2NHCH_2CH_2COONa$ (II-19)

$NH_2NHCH_2COONa$ (II-20)

$H_2NNHCH_2CH_2SO_3Na$ (II-21)

$H_2NNHCH(C_4H_9(n))COOH$ (II-22)

$H_2NNHCH(C_6H_{13}(n))COOH$ (II-23)

$H_2NN(CH(C_4H_9(n))COOH)_2$ (II-24)

$H_2NN(CH_2CH_2SO_3Na)_2$ (II-25)

$H_2NN(CH_2CH_2CH_2SO_3Na)_2$ (II-26)

$H_2NN(CH(C_2H_5)COOH)_2$ (II-27)

$H_2NNHCH(CH_3)COOH$ (II-28)

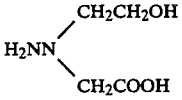
(II-29)

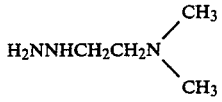
(II-30)

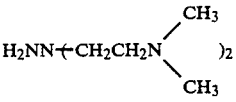
(II-31)

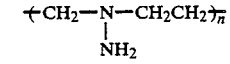
(II-32)

(average molecular weight = about 4,000)

-continued
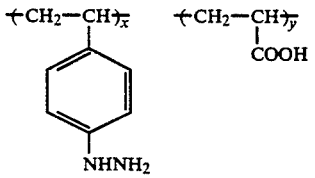
(II-33)
x:y = 60:40
(average molecular weight = about 20,000)
$NH_2NHCONH_2$ (II-34)
$NH_2NHC(=NH)NH_2$ (II-35)
$NH_2NHCONHNH_2$ (II-36)
$NH_2NHSO_3H$ (II-37)
$NH_2NHSO_2NHNH_2$ (II-38)
$CH_3NHNHSO_2NHNHCH_3$ (II-39)
$NH_2NHCONH-(CH_2)_3-NHCONHNH_2$ (II-40)
(II-41)
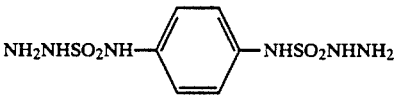
$NH_2NHCOCONHNH_2$ (II-42)
(II-43)
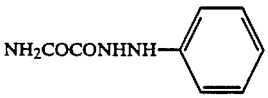
(II-44)
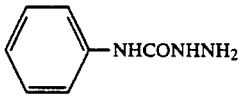
(II-45)
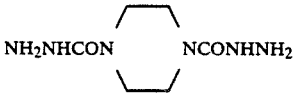
$NH_2COCONHNH_2$ (II-46)
(II-47)
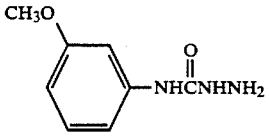
(II-48)
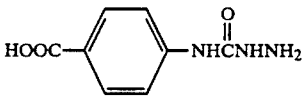
(II-49)
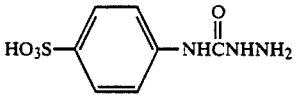
(II-50)
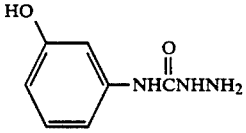
-continued
(II-51)
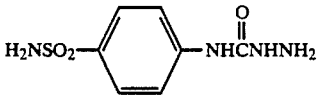
(II-52)
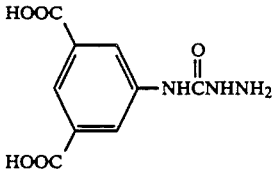
(II-53)
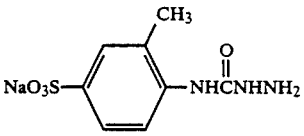
(II-54)
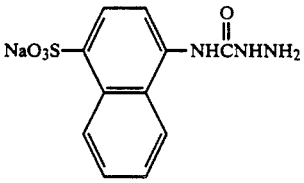
(II-55)
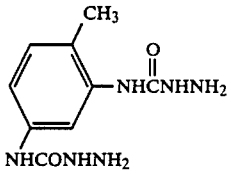
(II-56)
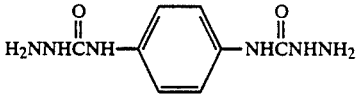
(II-57)
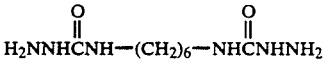
(II-58)
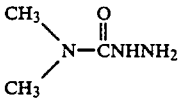
(II-59)
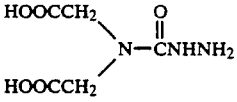
(II-60)
$NaO_3SCH_2CH_2NHC(=O)NHNH_2$
(II-61)
$HOOCCH_2CH_2NHC(=O)NHNH_2$
(II-62)
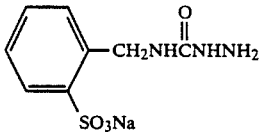
$NH_2NHCOOC_2H_5$ (II-63)
$NH_2NHCOCH_3$ (II-64)

-continued (II-65)

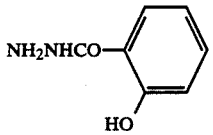

(II-66)

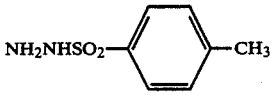

$NH_2NHCH_2PO_3H_2$ (II-67)

(II-68)

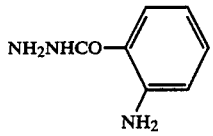

(II-69)

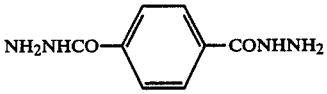

(II-70)

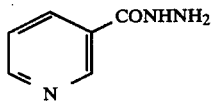

(II-71)

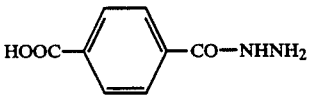

(II-72)

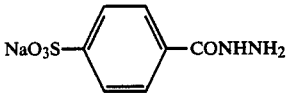

$(CH_3)_3CCONHNH_2$ (II-73)

(II-74)

$(CH_3)_3CC(=O)NHNH_2$ (II-75)

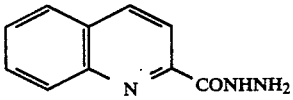

(II-76)

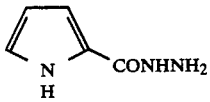

(II-77)

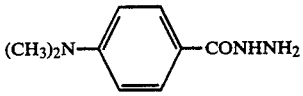

(II-78)

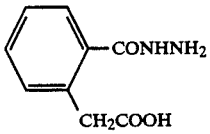

-continued (II-79)

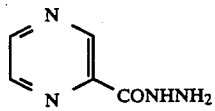

$HOCH_2CH_2SO_2NHNH_2$ (II-80)

$NaO_3SCH_2CH_2CONHNH_2$ (II-81)

$H_2NCONHCH_2CH_2SO_2NHNH_2$ (II-82)

(II-83)

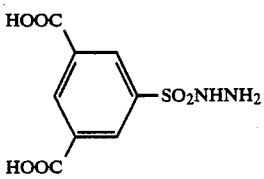

(II-84)

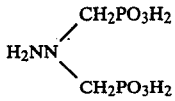

$H_2NNHCH_2CH_2PO_3H_2$ (II-85)

(II-86)

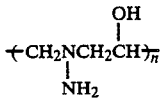

As specific examples other than the above-described compounds, there are illustrated those which are described in, for example, JP-A No. 63-146041 (Japanese Patent Application No. 61-170756), pp. 11–24, JP-A No. 63-146042 (Japanese Patent Application No. 6-171682), pp. 12–22, and JP A-63-146043 (Japanese Patent Application No. 61-173468), pp. 9–19.

Many of the compounds represented by general formula (II) are commercially available, and may be synthesized according to general synthesizing processes described in, for example, *Organic Synthesis,* Coll. vol. 2, pp. 208–213; *Jour. Amer. Chem. Soc.,* 36, 1747 (1914); *Abura Kagaku (Oil Chemistry),* 24, 31 (1975); *Jour. Org. Chem.,* 25, 44 (1960); *Yakugaku Zasshi (Journal of Pharmaceutics),* 91, 1127 (1971); *Organic Synthesis,* Coll. vol. 1, p. 450; *Shin Jikken Kagaku Koza (New Lecture on Experimental Chemistry),* Vol. 14, III, pp. 1621–1628 (published by Maruzen); *Beil.* 2, 559; *Beil.,* 3, 117; E. B. Mohr et al., *Inorg. Syn.,* 4, 32 (1953); F. J. wilson, E. C. Pickering, *J. Chem. Soc.,* 123, 394 (1923); N. J. Leonard & J. H. Boyer, *J. Org. Chem.,* 15, 42 (1950); *Organic Synthesis,* Coll. vol. 5, p. 1055; P. A. S. Smith, *Derivatives of hydrazine and other hydronitrogens having N—N bonds,* pp. 120–124 and 130–131, THE BENJAMIN/-CUMMINGS COMPANY, (1983); Staniey R. Sandier Waif Karo, *Organic Functional Group Preparations,* Vol. 1, Second Edition, p. 457.

The compounds of general formula (II) are added in amounts of 0.01 g to 50 g, preferably 0.1 g to 30 g, more preferably 0.5 g to 10 g, per liter of color developer.

Color developers used in the present invention are described below.

Color developers used in the present invention contain known aromatic primary amine color developing agents. Preferable examples thereof are p-phenylenediamine derivatives, and typical examples thereof are illustrated below which, however, are not limitative.

D-1: N,N-Diethyl-p-phenylenediamine

D-2: 4-(N-Ethyl-N-(β-hydroxyethyl)amino)aniline

D-3: 2-Methyl-4-(N-ethyl-N-(β-hydroxyethyl)amino) aniline

4-Amino-3-methyl-N-ethyl-N-(β-(methanesulfonamido)-ethyl)aniline

These p-phenylenediamine derivatives may be in a salt form such as sulfates, hydrochlorides, sulfites or p-toluenesulfonates. The aromatic primary amine developing agents are used in amounts of, preferably about 0.1 g to about 20 g, more preferably about 0.5 g to about 10 g, per liter of color developing solution.

Particularly, the use of color-developing agent D-4 in the presence of the compounds of general formula (I) depresses an increase of fog and, therefore, serves to provide good photographic properties, thus being preferable.

Sulfite ion known as preservative is not substantially incorporated in the color developer of the present invention. The term "not substantially" permits one to add in an amount not influencing photographic properties, specifically in an amount of 0 to 0.005 mol/liter, preferably 0 to 0.002 mol/liter.

As compounds which directly preserve the color-developing agents, various hydroxylamines, hydroxamic acids described in JP-A No. 63-43138, phenols described in JP-A No. 63-44657 and JP-A No. 63-58443, α-hydroxyketones and α-aminoketones described in JP-A No. 63-44656 and/or various sugars described in JP-A No. 63-36244 are preferably added. If necessary, these compounds may be used in combination with monoamines described in JP-A No. 63-4235, JP-A No. 63-24254, JP-A No. 63-21647, JP-A No. 63-146040, JP-A No. 63-27841 and JP-A No. 63-25654, diamines described in JP-A No. 63-43139 and JP-A No. 63-30845, polyamines described in JP-A No. 63-26655, polyamines described in JP-A No. 63-44655, nitroxy radicals described in JP-A No. 63-53551, alcohols described in JP-A No. 63-43140 and JP-A No. 63-53549, oximes described in JP-A No. 63-56654, and tertiary amines described in EP-A-266797.

In addition, various metals described in JP-A No. 57-44148 and JP-A No. 57-53749, salicylic acids described in JP-A No. 59-180588, alkanolamines described in JP-A No. 54-3532, polyethyleneimines described in JP-A No. 56-94349, and aromatic polyhydroxy compounds described in U.S. Pat. No. 3,746,544 are preferably used. Particularly, addition of aromatic polyhydroxy compounds, triethanolamine, and compounds described in EP-A-266797 is preferable.

The color developer of the present invention preferably does not substantially contain benzyl alcohol in view of preventing an increase in fog and stain after processing. That is, "not substantially containing" means to contain benzyl alcohol in an amount of up to 5.0 ml, preferably up to 2 ml, per liter of the color developer, more preferably 0 ml.

The color developer used in the present invention preferably has a pH of 9 to 12, more preferably 9 to 11, and may further contain known developer components.

In order to keep pH in the above-described range, various buffer agents are preferably used. As the buffer agents, carbonic acid salts, phosphoric acid salts, boric acid salts, tetraboric acid salts, hydroxybenzoic acid salts, glycine salts, N,N-dimethylglycine salts, leucine salts, norleucine salts, guanine salts, 3,4-dihydroxyphenylalanine salts, alanine salts, aminobutyric acid salts, 2-amino-2-methyl-1,3-propanediol salts, valine salts, proline salts, trishydroxyaminomethane salts, lysine salts, etc. may be used. In particular, carbonic acid salts, phosphoric acid salts, tetraboric acid salts and hydroxybenzoic acid salts are excellent in solubility and buffering ability in the higher pH region of more than 9.0, do not exert detrimental influences (for example, fogging) on photographic properties when added to color developers, and are inexpensive. Thus, their use is particularly preferable.

Specific examples of these buffer agents include sodium carbonate, potassium carbonate, sodium bicarbonate, potassium bicarbonate, trisodium phosphate, tripotassium phosphate, disodium phosphate, dipotassium phosphate, sodium borate, potassium borate, sodium tetraborate (borax), potassium tetraborate, sodium o-hydroxybenzoate (sodium salicylate), potassium o-hydroxybenzoate, sodium 5-sulfo-2-hydroxybenzoate (sodium 5-sulfosalicylate), potassium 5-sulfo-2-hydroxybenzoate (potassium 5-sulfosalicylate), etc. However, these do not limit the present invention in any way.

These buffer agents are added to color developers in amounts of preferably not less than 0.1 mol/liter, particularly preferably 0.1 mol/liter to 0.4 mol/liter.

In addition, various chelating agents may be used in the color developer as agents for preventing precipitation of calcium or magnesium or for improving the stability of the color developer.

As the chelating agents, organic acid compounds are preferable, which are exemplified by the aminopolycarboxylic acids described in JP-B No. 48-30496 and JP-B No. 44-30232, organophosphonic acids described in JP-A No. 56-97347, JP-B No. 56-39359 and West German Pat. No. 2,227,639, phosphonocarboxylic acids described in JP-A No. 52-102726, JP-A No. 53-42730, JP-A No. 54-121127, JP-A No. 55-126241 and JP-A No. 55-659506, and compounds described in JP-A No. 58-195845, JP-A No. 58-203440 and JP-B No. 53-40900. Specific examples thereof are illustrated below which, however, are not limitative.

Nitrilotriacetic acid, diethylenetriaminepentaacetic acid, ethylenediaminetetraacetic acid, N,N,N-trimethylenephophosphonic acid, ethylenediamine-N,N,N',N'-tetramethylene phosphonic acid, trans-cyclohexanediaminetetraacetic acid, 1,2-diaminopropanetetraacetic acid, glycol ether diaminetetraacetic acid, ethylenediamine-o-hydroxyphenylacetic acid, 2-phosphonobutane-1,2,4-tricarboxylic acid, 1-hydroxyethylidene-1,1-diphosphonic acid, N,N'-bis(2-hydroxybenzyl)ethylenediamine-N,N'-diacetic acid, etc.

Two or more of these chelating agents may be used in combination as the case demands.

These chelating agents are added in a sufficient amount to mask metal ions in the color developer, for example, about 0.1 g to about 10 g per liter.

An arbitrary development accelerator may be added to the color developer as the case demands. However, in view of prevention of environmental pollution, convenience of preparation, and prevention of fogging, the color developer of the present invention preferably does not substantially contain benzyl alcohol.

The compounds to be used in the present invention represented by the foregoing general formula (II) provide remarkable effects as to stability of color developers not substantially containing benzyl alcohol.

As other development accelerators, thioether compounds described in JP-B No. 37-16088, JP-B No. 37-5987, JP-B No. 38-7826, JP-B No. 44-12380, JP-B No. 45-9019 and U.S. Pat. No. 3,813,247, p-phenylenediamine compounds described in JP-A No.

52–49829 and JP-A No. 50–15554, quaternary ammonium salts described in JP-A No. 50-137726, JP-B No. 44-30074, JP-A No. 56-156826 and JP-A No. 52-43429, amine compounds described in U.S. Pat. Nos. 2,494,903, 3,128,182, 4,230,796 and 3,253,919, JP-B No. 41–11431, U.S. Pat. Nos. 2,482,546, 2,596,926 and 3,582,346, polyalkylene oxides described in JP-B No. 37-16088, JP-B No. 42-25201, U.S. Pat. No. 3,128,183, JP-B No. 41-11431, JP-B42-23883 and U.S. Pat. No. 3,532,501, and 1-phenyl-3-pyrazolidones and imidazoles may be added as the case demands.

In the present invention, any antifogging agent(s) may be added as the case demands. As the antifogging agents, alkali metal halides such as sodium chloride, potassium bromide and potassium iodide and organic antifogging agents may be used. As typical examples of organic antifogging agents, there are illustrated nitrogen-containing heterocyclic compounds such as benzotriazole, 6-nitrobenzimidazole, 5-nitroisoindazole, 5-methylbenzotriazole, 5-nitrobenzotriazole, 5-chlorobenzotriazole, 2-thiazolyl-benzimidazole, 2-thiazolylmethyl-benzimidazole, indazole, hydroxyazaindolidine and adenine.

The color developer used in the present invention preferably contains a fluorescent brightening agent. As the fluorescent brightening agent, 4,4'-diamino-2,2-disulfostilbene compounds are preferable. They are added in amounts of 0 g to 5 g/liter, preferably 0.1 g to 4 g /liter.

Various surface active agents such as alkylsulfonic acids, arylsulfonic acids, aliphatic carboxylic acids, aromatic carboxylic acids, etc., may be added as the case demands.

The processing temperature of the color developer of the present invention is generally 20° to 50 ° C. and more preferably 30° to 40 ° C. The processing time is generally 20 seconds to 5 minutes, and more preferably 30 seconds to 2 minutes. The replenishing amount is desirably minimized, and is generally 20 to 600 ml, preferably 50 to 300 ml, more preferably 100 to 200 ml, per $m^2$ of light-sensitive material.

The color photographic material used in the present invention is generally subjected to bleaching or bleach-fixing after developing.

A bleaching solution, a bleach-fixing solution, and a fixing solution used in the present invention are described below.

As bleaching agents used in the bleaching solution or bleach-fixing solution in the method of the present invention, any conventional bleaching agents may be used, with iron(III) organic complex salts (for example, complex salts of aminopolycarboxylic acids such as ethylenediaminetetraacetic acid or diethylenetriaminepentaacetic acid, aminopolyphosphonic acid, phosphonocarboxylic acid and organophosphonic acid) or iron(III) salts of organic acids (for example, citric acid, tartaric acid and malic acid); persulfates; and hydrogen peroxide being preferable.

Of these, iron(III) organic complex salts are particularly preferable in view of rapid processing and prevention of environmental pollution. Aminopolycarboxylic acids, aminopolyphosphonic acids or organophosphonic acids, or their salts useful for forming the iron(III) organic complex salts are illustrated below: ethylenediaminetetraacetic acid, diethylenetriaminepentaacetic acid, 1,3-diaminopropanetetraacetic acid, propylenediaminetetraacetic acid, nitrilotriacetic acid, cyclohexanediaminetetraacetic acid, methyliminodiacetic acid, iminodiacetic acid, glycol ether diaminetetraacetic acid, etc.

These compounds may be in the form of sodium salts, potassium salts, lithium salts and ammonium salts. Of these, iron(III) complex salts of ethylenediaminetetraacetic acid, diethylenetriaminepentaacetic acid, cyclohexanediaminetetraacetic acid, 1,3-diaminopropanetetraacetic acid, and methyliminodiacetic acid are preferred due to their high bleaching ability.

These ferric ion complex salts may be used in complex salt form, or may be formed in solution by using a ferric salt such as ferric sulfate, ferric chloride, ferric nitrate, ferric ammonium sulfate or ferric phosphate and a chelating agent such as an aminopolycarboxylic acid, aminopolyphosphonic acid or phosphonocarboxylic acid. The chelating agent may be added in an amount more than that amount necessary for forming the ferric ion complex salt. Of the iron complexes, aminopolycarboxylic acid/iron complexes are preferable, which are added in amounts of 0.01 to 1.0 mol/liter, preferably 0.05 to 0.50 mol/liter.

Various compounds may be used as bleaching accelerator in the bleaching solution, bleach-fixing solution and/or pre-baths thereof. For example, mercapto group- or disulfido bond-containing compounds described in U.S. Pat. No. 3,893,858, West German Pat. No. 1,290,812, JP-A No. 53-95630 and Research Disclosure, 17129 (July 1978), thiourea compounds described in JP-B No. 45-8506, JP-A No. 52-20832, JP-A No. 53-32735 and U.S. Pat. No. 3,706,561, and halides such as iodine ion and bromine ion are preferable due to their excellent bleaching ability.

Further, the bleaching or bleach-fixing solution used in the present invention may contain bromide (for example, potassium bromide, sodium bromide or ammonium bromide), chloride (for example, potassium chloride, sodium chloride or ammonium chloride) or iodide (for example, ammonium iodide) as a rehalogenating agent. If necessary, one or more inorganic acids, organic acids and alkali metal salts or ammonium salts thereof having a buffering ability, such as boric acid, borax, sodium metaborate, acetic acid, sodium acetate, sodium carbonate, potassium carbonate, phosphorous acid, phosphoric acid, sodium phosphate, citric acid, sodium citrate and tartaric acid, or anti-corrosives such as ammonium nitrate and guanidine may be added thereto.

Fixing agents used in the bleach-fixing or fixing solution used in the method of the present invention are known conventional fixing agents, i.e., water-soluble silver halide dissolving agents such as thiosulfates (e.g., sodium thiosulfate and ammonium thiosulfate), thiocyanates (e.g., sodium thiocyanate and ammonium thiocyanate) , thioether compounds (e.g., ethylenebisthioglycolic acid and 3,6-dithia-1,8-octanediol) and thioureas. These may be used alone or as a combination of two or more. Special bleach-fixing solutions comprising a combination of a fixing agent and a large amount of halide such as potassium iodide described in JP-A No. 55-155354 may also be used. In the present invention, the use of thiosulfates, particularly ammonium thiosulfate, is preferred. The amount of fixing agent ranges from 0.3 to 2 mols, preferably 0.5 to 1.0 mol, per liter.

The bleach-fixing solution or fixing solution used in the present invention preferably has a pH of 3 to 10, more preferably 5 to 9.

The bleach-fixing solution may further contain various fluorescent brightening agents, defoaming agents, surfactants, polyvinyl pyrrolidone and organic solvents (e.g., methanol).

The bleach-fixing or fixing solution of the present invention can contain, as a preservative, sulfite ion-releasing compounds such as sulfites (e.g., sodium sulfite, potassium sulfite and ammonium sulfite), bisulfites (e.g., ammonium bisulfite, sodium bisulfite and potassium bisulfite), and metabisulfites (e.g., potassium metabisulfite, sodium metabisulfite, and ammonium metabisulfite). These compounds are incorporated in amounts of preferably about 0.02 to about 0.50 mol/liter, more preferably 0.04 to 0.40 mol/liter, calculated as sulfite ion.

As the preservatives, sulfite salts are commonly added. However, ascorbic acid, carbonyl-bisulfite adducts, carbonyl compounds, etc., may also be added.

Further, buffering agents, fluorescent brightening agents, chelating agents, defoaming agents, antifungal agents, etc., may be added as the case demands.

After being subjected to the desilvering processing of fixing or bleach-fixing, the silver halide color photographic material used in the present invention is generally subjected to water-washing and/or stabilizing.

The amount of washing water used in the water-washing washing step can be selected from a wide range depending upon the characteristics of light-sensitive materials (for example, the kinds of used materials such as couplers), uses, and, further, conditions such as the temperature of the washing water, number of washing tanks (or steps), replenishing manner (such as counter current or direct current), and the like. Of these, the relationship between the number of water-washing tanks and the amount of water in a multi-stage counter current process can be determined according to *Journal of the Society of Motion Picture and Television Engineers,* Vol. 64, pp. 248–253 (May 1955). The number of steps in multi-stage counter current process is usually 2 to 6, preferably 2 to 4.

The multi-stage counter current process enables one to greatly reduce the amount of washing water. For example, the amount of washing water may be 0.5 liter to 1 liter per $m^2$ of light-sensitive materials. However, such involves various problems such as the propagation of bacteria caused by a prolonged residence time of the washing water in a tank leads to the production of suspended matter which adheres to light-sensitive materials. In processing the color light-sensitive material of the present invention, reducing the concentration of calcium and magnesium ions described in JP-A No. 62-288838 intended to solve the problem is extremely effective. In addition, isothiazolone compounds and thiabendazole described in JP-A No. 57-8542, chlorine-containing containing bactericides such as sodium chloroisocyanurate, etc., and bactericides such as benzotriazoles and copper ion described in Hiroshi Horiguchi; *Bokin-bobai No Kagaku* (*Antibacterial and Antifungal Chemistry*), Eisei Gijutsu-kai; *Biseibutsu No Mekkin, Sakkin, Bobai Gijutsu* (*Sterilizing and antifungal techniques against microorganisms*), and Nihon Bokin-bobai Gakkai; *Bokin-bobaizai Jiten* (*Antibacterial and antifungal book*) can be used.

Further, the washing water may contain a surfactant as a draining agent and may contain a chelating agent represented by ethylenediaminetetraacetic acid as a hard-water softener.

The pH of the washing water used in processing the light-sensitive material of the present invention generally ranges from 4 to 9, preferably 5 to 8. The temperature and time of washing may be varied depending upon the characteristics of the light-sensitive material, end use, etc., but, in general, a washing temperature of 15° to 45° C. and a washing time of 20 seconds to 10 minutes, preferably a washing temperature of 25° to 40° C. and a washing time of 30 seconds to 5 minutes, are employed.

The light-sensitive material may be processed with a stabilizing solution subsequent to the above-described water-washing step or directly without the water-washing step. To the stabilizing bath are added compounds having image-stabilizing ability. For example, there are illustrated aldehyde compounds represented by formalin, buffering agents for adjusting the film pH to a level suited for stabilizing dyes, and ammonium compounds. In addition, in order to prevent the propagation of bacteria in the solution or to impart antifungal properties to processed light-sensitive materials, various bactericides and fungicides hereinbefore described may be used.

Further, a surfactant, a fluorescent brightening agent, and a hardener may be added thereto. In the case of directly conducting the stabilizing procedure in the processing of the present invention without the water-washing step, known techniques described in JP-A No. 57-8543, JP-A No. 58-14834, JP-A No. 59-184343, JP-A No. 60-220345, JP-A No. 238832, JP-A No. 60-239784, JP-A No. 60-239749, JP-A No. 61-4054, JP-A No. 61-118749, etc., may be employed.

In addition, the use of chelating agents such as 1-hydroxyethylidene-1,1-diphosphonic acid and ethylenediamine-tetramethylenephosphonic acid, and magnesium or bismuth compounds is also a preferable embodiment for the stabilizing solution.

The solution used in the washing and/or stabilizing step may be used in the prior step. As one example thereof, an over-flow of washing water whose amount is decreased by the multi-stage counter current manner is introduced into its pre-bath of bleach-fixing bath, into which a concentrated solution is replenished, thus the amount of waste solution being reduced.

The method of the present invention may be applied in any processing that uses a color developer. For example, it may be applied to the processing of color papers, color reversal papers, color direct positive light-sensitive materials, color positive films, color negative films, color reversal films, etc., particularly preferably color papers and color reversal papers.

As the silver halide emulsion for the light-sensitive material to be used in the present invention, those emulsions which have any halide composition, such as silver iodobromide, silver bromide, silver chlorobromide and silver chloride, may be used. For example, in the case of conducting accelerated processing or low-replenishing processing of color papers or the like, silver chlorobromide emulsions containing 60 mol % or more silver chloride or silver chloride emulsions are preferable, with the content of silver chloride being particularly preferably 80 to 100 mol %. In the case where high speed is required and where fogging upon preparation, during storage and/or upon processing of light-sensitive material is required by to be depressed to a particularly low level, silver chlorobromide emulsions containing 50 mol % or more silver bromide or silver bromide emulsions (optionally containing up to 3 mol % silver iodide) are preferable, with the content of silver bromide being particularly preferably 70 mol % or more. For color light-sensitive materials for picture taking, silver iodobromide and silver chloroiodobromide are preferable, with the silver iodide content preferably being 3 to 15 mol %.

The silver halide grains used in the present invention may have an inner portion and a surface layer different from each other in phase composition, may be of a multi-phase structure having a conjunction structure, or may wholly comprise a uniform phase. Further, mixtures thereof can be used.

Average grain size (presented in terms of diameter of grains with respect to spherical or approximately spherical grains or, with cubic grains, calculated based on projected area taking the edge length as grain size) of silver halide grains used in the present invention is preferably 0.1 μm to 2 μm, particularly preferably 0.15 μm to 1.5 μm. Grains size distribution may be narrow or broad, but monodispersed emulsions which have a coefficient of variation (standard deviation value/average grain size in the grain size distribution curve of silver halide emulsion) of within ±20%, particularly preferably with ±15%, are preferably used in the present invention. In order to obtain a satisfactory gradiation intended for the light-sensitive material, two or more kinds of monodispersed silver halide emulsions (having preferably monodisperse properties falling within the above-described range of coefficient of variation) may be used as a mixture in one and the same layer or separately coated as superposed layers to provide emulsion layers having substantially the same color sensitivity. Further, two or more polydispersed silver halide emulsions or a combination of a monodispersed emulsion and a polydispersed emulsion may be used as a mixture or by coating as separate and superposed layers.

Silver halide grains used in the present invention may be in a regular crystal form such as cubic, octahedral, rhombic dodecahedral or tetradecahedral form or a mixture thereof, in an irregular crystal form such as spherical, or in a composite form thereof. In addition, tabular grains are also usable. Emulsions wherein tabular grains having a length-to-thickness ratio of 5 to 8, or 8 or more, account for 50% or more of the total projected area of the grains may also be used. Emulsions comprising a mixture of these various crystal forms may be used as well. Either surface latent image-forming type silver halide grains forming a latent image mainly on the surface thereof or internal latent image-forming type grains forming a latent image in the interior thereof may be used.

The photographic emulsions used in the present invention can be prepared according to processes described in *Research Disclosure* (RD), vol. 170, Item No. 17643 (I, II, III) (December, 1978).

The silver halide emulsions to be used in the present invention are usually subjected to physical ripening, chemical ripening, and spectral sensitization before use. Additives used in these steps are described in *Research Disclosure,* vol. 176, No. 17643 (December, 1978) and *Research Disclosure,* vol. 187, No. 18716 (November, 1979). Places where such additives are described are tabulated in the table to be shown hereinafter.

Known photographic additives which can be used in the present invention are also described in the above two Research Disclosure articles, and places where they are described are also tabulated in the following table.

| Kind of Additive | RD 17643 | RD 18716 |
|---|---|---|
| 1. Chemical sensitizers | p. 23 | p. 648, right col. |
| 2. Sensitivity-increasing agents | | " |
| 3. Spectrally sensitizing agents | pp. 23–24 | p. 648, right col. to 649, right col. |
| 4. Supersensitizing agents | " | " |
| 5. Brightening agents | p. 24 | |
| 6. Antifoggants and stabilizers | pp. 24–25 | p. 649, right col. |
| 7. Couplers | p. 25 | |
| 8. Organic solvents | p. 25 | |
| 9. Light absorbents and filter dyes | pp. 25–26 | p. 649, right col. to 650, left col. |
| 10. UV ray absorbents | " | " |
| 11. Stain-preventing agents | p. 25, right col. | p. 650 left - right col. |
| 12. Dye image stabilizers | p. 25 | |
| 13. Hardeners | p. 26 | p. 651, left col. |
| 14. Binders | p. 26 | " |
| 15. Plasticizers and lubricants | p. 27 | p. 650, right col. |
| 16. Coating aids and surfactants | pp. 26–27 | " |
| 17. Antistatic agents | p. 27 | " |

Various couplers may be used in the present invention other than the magenta couplers of general formula (I). The term "color couplers" as used herein means those compounds which undergo a coupling reaction with an oxidation product of aromatic primary amine developing agent to produce dyes. Typical examples of useful color couplers include naphtholic or phenolic couplers, pyrazolone or pyrazoloazole type compounds, and open-chain or heterocyclic ketomethylene compounds. Specific examples of such cyan, magenta, and yellow couplers used in the present invention are described in those patents which are cited in *Research Disclosure,* (RD), 17643 (December, 1978), Item VII-D and ibid., 18717 (November, 1979).

Color couplers incorporated in the light-sensitive materials preferably have a ballast group or are polymerized to acquire diffusion resistance. In comparison with 4-equivalent color couplers having hydrogen atoms in coupling active sites, two equivalent color couplers substituted by coupling-off groups in coupling active sites permit one to reduce the amount of coated silver. Couplers which can form color dyes with suitable diffusibility, non-color forming couplers, DIR couplers capable of releasing a development inhibitor upon coupling reaction, or couplers capable of releasing a development accelerator may also be used.

Typical examples of yellow couplers which can be used in the present invention include oil protected type acylacetamide couplers. Specific examples thereof are described in U.S. Pat. Nos. 2,407,210, 2,875,057 and 3,265,506, etc. In the present invention, the use of two equivalent yellow couplers is preferable, and typical examples thereof include yellow couplers of the oxygen atom coupling-off type described in U.S. Pat. Nos. 3,408,194, 3,447,928, 3,933,501 and 4,022,620, etc., and yellow couplers of the nitrogen atom coupling-off type described in JP-B No. 55-10739, U.S. Pat. Nos. 4,401,752 and 4,326,024, *Research Disclosure,* RD 18053 (April, 1979), British Pat. No. 1,425,020, West German Patent Application (OPI) Nos. 2,219,917, 2,261,361, 2,329,587 and 2,433,812, etc. α-Pivaloylacetanilide type couplers are excellent in fastness, particularly light fastness, of colored dyes, whereas α-benzoylacetanilide type couplers provide high coloration density.

Magenta couplers which can be used in the present invention include oil protected type indazolone or cyanoacetyl, preferably pyrazoloazole type (e.g., pyrazolone) couplers. Of the 5-pyrazolone couplers, those which are substituted by an arylamino group or an acylamino group in the 3-position are preferable in view of the hue and coloration density of the colored dyes. Typical examples thereof are described in U.S. Pat. Nos. 2,311,082, 2,343,703, 2,600,788, 2,908,573, 3,062,653, 3,152,896 and 3,936,015. As coupling-off groups for 2-equivalent 5-pyrazolone couplers, nitrogen atoms coupling-off groups described in U.S. Pat. No. 4,310,619 and arylthio groups described in U.S. Pat. No. 4,351,897 are particularly preferable. The ballast group-containing 5-pyrazolone couplers described in European Pat. No. 73,636 provide high coloration density.

Cyan couplers which can be used in the present invention include oil protected type naphtholic and phenolic couplers. Typical examples thereof include naphtholic couplers described in U.S. Pat. No. 2,474,293, preferably oxygen atom coupling-off type 2-equivalent naphtholic couplers described in U.S. Pat. Nos. 4,052,212, 4,146,396, 4,228,233 and 4,296,200. Specific examples of the phenolic couplers are described in U.S. Pat. Nos. 2,369,929, 2,801,171, 2,772,162, 2,895,826, etc. Cyan couplers capable of forming dyes fast against high humidity and high temperature are preferably used in the present invention, and typical examples thereof include phenolic cyan couplers having an alkyl group containing 2 or more carbon atoms at the m-position of the phenol nucleus described in U.S. Pat. No. 3,772,002, 2,5-diacylamino-substituted phenolic couplers described in U.S. Pat. Nos. 2,772,162, 3,758,308, 4,126,396, 4,334,011, and 4,327,173, West German Patent Application (OLS) No. 3,329,729, and JP-A No. 59-166956, etc., and phenolic couplers having a phenylureido group in the 2-position and an acylamino group in the 5-position, described in U.S. Pat. Nos. 3,446,622, 4,333,999, 4,451,559 and 4,427,767, etc.

Graininess can be improved by using those couplers which form dyes with proper diffusibility. As such couplers forming diffusible dyes, U.S. Pat. No. 4,366,237 and British Pat. No. 2,125,570 describe specific examples of magenta couplers, and European Pat. No. 96,570 and West German Patent Application (OLS) No. 3,234,533 describe specific examples of yellow, magenta, or cyan couplers.

The dye-forming couplers and the above-described special couplers may form a dimer or higher polymer. Typical examples of polymerized dye-forming couplers are described in U.S. Pat. Nos. 3,451,820 and 4,080,211. Specific examples of polymerized magenta couplers are described in British Pat. No. 2,102,173 and U.S. Pat. No. 4,367,282.

Two or more of the various couplers used in the present invention may be used in one and the same light-sensitive layer, or one and the same compound may be used in two or more layers for obtaining photographic characteristics required for light-sensitive materials.

The couplers used in the present invention may be introduced into light-sensitive materials according to various known dispersing processes. Examples of high-boiling organic solvents to be used in the oil-in-water dispersing process are described in, for example, U.S. Pat. No. 2,322,027. Steps and effects of latex dispersing processes, and specific examples of latexes for impregnation are described in U.S. Pat. No. 4,199,363, West German Patent Application (OLS) Nos. 2,541,274 and 2,541,230.

Standard amounts of color couplers other than the magenta couplers of general formula (I) are 0.001 to 1 mol per mol of light-sensitive silver halide and, preferably, 0.01 to 0.5 mol with respect to yellow couplers, 0.003 to 0.3 mol with respect to magenta couplers, and 0.002 to 0.3 mol with respect to cyan couplers.

The photographic light-sensitive material used in the present invention is coated on a conventional flexible support such as a plastic film (for example, cellulose nitrate, cellulose acetate, or polyethylene terephthalate) or paper or on a rigid support such as glass. Supports and coating processes are described in detail in *Research Disclosure,* vol. 176, Item 17643, XV (p. 27) and XVII (p. 28) (December 1978).

In the present invention, a reflective support is preferably used. "Reflective supports" serve to raise reflectivity to make distinct the dye image formed in the silver halide emulsion layers. Such reflective supports include those which are prepared by coating a hydrophobic resin containing dispersed therein a light-reflecting substance such as titanium oxide, zinc oxide, calcium carbonate or calcium sulfate on a support and those which comprise a hydrophobic resin containing dispersed therein the light-reflecting substance.

The present invention is now described in greater detail by reference to the following examples which, however, are not to be construed as limiting the present invention in any way.

EXAMPLE 1

Multi-layer color photographic print papers having the stratum structure shown in Table A on a paper support double-laminated with polyethylene were prepared with changing the magenta couplers used. Coating solutions were prepared as follows.

Preparation of a coating solution for forming the first layer 27.2 ml of ethyl acetate and 7.7 ml of solvent (c) were added to 19.1 g of yellow coupler (a) and 4.4g of color image stabilizer (b), and the resulting solution was emulsified and dispersed in 185 ml of a 10% gelatin aqueous solution containing 8 ml of 10% sodium dodecylbenzenesulfonate. On the other hand, a silver chlorobromide emulsion(containing 90.0 mol % of silver bromide and 70 g/kg of Ag) containing $5.0\times10^{-4}$ mol of the following blue-sensitive sensitizing dye per mol silver was prepared. The aforesaid emulsion dispersion and this emulsion were mixed with each other according to the formulation in Table A to prepare a coating solution for forming the first layer. Coating solutions for forming the second to seventh layers were also prepared in the same manner as with the coating solution for forming the first layer. As gelatin hardener for each layer, sodium salt of 1-hydroxy-2,5-dichloro-s-triazine was used.

Spectrally sensitizing dyes for respective layers are shown below.

Blue-sensitive emulsion layer:

-continued

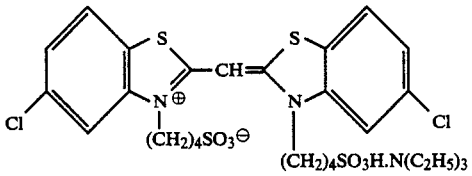

($5.0 \times 10^{-4}$ mol per mol of silver halide)

Green-sensitive emulsion layer:

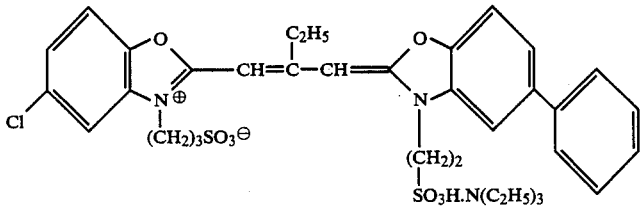

($4.0 \times 10^{-4}$ mol per mol of silver halide) and

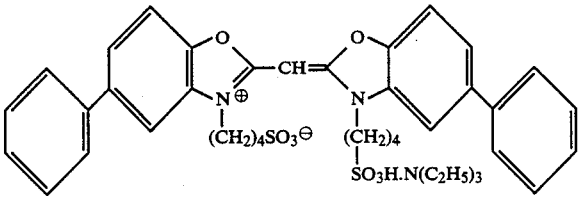

($7.0 \times 10^{-5}$ mol per mol of silver halide)

Red-sensitive emulsion layer:

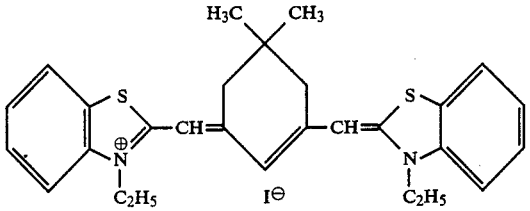

($0.9 \times 10^{-4}$ mol per mol of silver halide)

To the red-sensitive emulsion layer was added the following compound in an amount of $2.6 \times 10^{-3}$ mol per of silver halide.

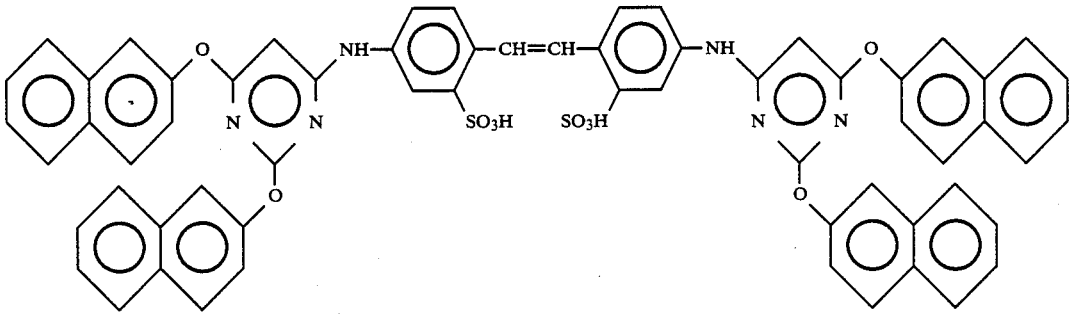

1-(5-methylureidophenyl)-5-mercaptotetrazole was added to the blue-sensitive emulsion layer, green-sensitive emulsion layer and red-sensitive emulsion layer in amounts of $8.5 \times 10^{-5}$ mol, $7.7 \times 10^{-4}$ mol, and $2.5 \times 10^{-4}$ mol, respectively, per mol of silver halide.

4-hydroxy-6-methyl-1,2,3a,7-tetrazaindene was added to the blue-sensitive emulsion layer and the green-sensitive emulsion layer in amounts of $1.2 \times 10^{-2}$ mol and $1.1 \times 10^{-2}$ mol, respectively, per mol of silver halide.

The following dyes were added to an intermediate layer for preventing irradiation:

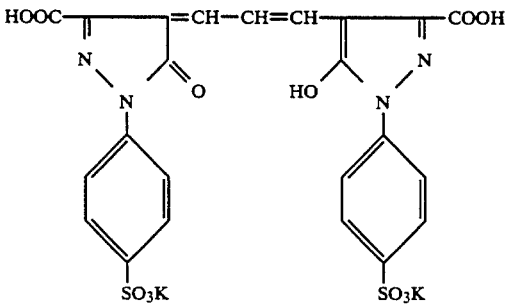

$3.6 \times 10^{-3}$ g/m$^2$

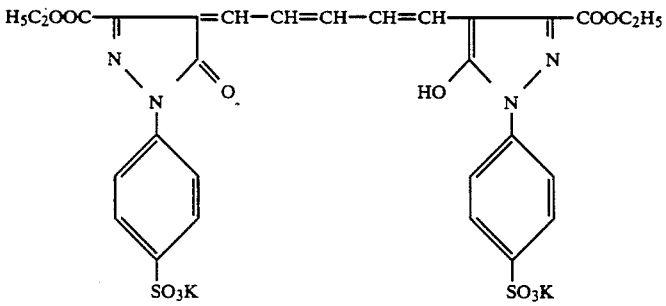

$1.36 \times 10^{-2}$ g/m$^2$

TABLE A

| Layer | Main Formulation | Used Amount |
|---|---|---|
| 7th layer (protective layer) | Gelatin | 1.33 g/m$^2$ |
| | Acryl-modified copolymer of polyvinyl alcohol (modification degree: 17%) | 0.17 " |
| | Liquid paraffin | 0.03 " |
| 6th layer (UV ray-absorbing layer) | Gelatin | 0.53 g/m$^2$ |
| | UV ray absorbent (i) | 0.21 " |
| | Solvent (k) | 0.08 " |
| 5th layer (red-sensitive layer) | AgClBr emulsion (AgBr:70 mol %) | 0.23 g/m$^2$ of Ag |
| | Gelatin | 1.34 g/m$^2$ |
| | Cyan coupler (l) | 0.34 " |
| | Color image stabilizer (m) | 0.17 " |
| | Polymer (n) | 0.40 " |
| | Solvent (o) | 0.23 " |
| 4th layer (UV ray-absorbing layer) | Gelatin | 1.58 g/m$^2$ |
| | UV ray absorbent (i) | 0.62 " |
| | Color mixing-preventing agent (j) | 0.05 " |
| | Solvent (k) | 0.24 " |
| 3rd layer (green-sensitive layer) | AgClBr emulsion (AgBr:80 mol %) | 0.16 g/m$^2$ of Ag |
| | Gelatin | 1.79 g/m$^2$ |
| | Magenta coupler (e) | $3.5 \times 10^{-4}$ mol/m$^2$ |
| | Color image stabilizer (f) | 0.20 g/m$^2$ |
| | Color image stabilizer (g) | 0.01 " |
| | Solvent (h) | 0.65 " |
| 2nd layer (color-mixing preventing layer) | Gelatin | 0.99 g/m$^2$ |
| | Color mixing-preventing agent (d) | 0.08 " |
| 1st layer (blue-sensitive layer) | AgClBr emulsion (AgBr:90 mol %) | 0.26 g/m$^2$ of Ag |
| | Gelatin | 1.83 g/m$^2$ |
| | Yellow coupler (a) | 0.83 " |
| | Color image stabilizer (b) | 0.19 " |
| | Solvent (c) | 0.35 " |
| Support | Polyethylene-laminated paper (containing a white pigment ($TiO_2$) and a bluish dye (Ultramarine) in polyethylene on the first layer-coated side) | |

Structural formulae of the compounds such as couplers used in Example 1 are as follows.

(a) Yellow coupler
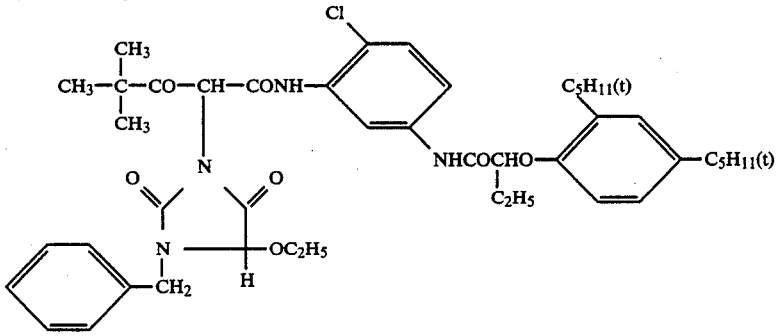
(b) Color image stablilizer
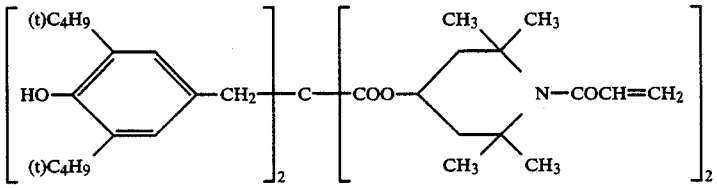
(c) Solvent
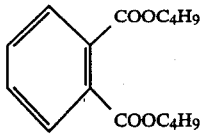
(d) Color mixing-preventing agent
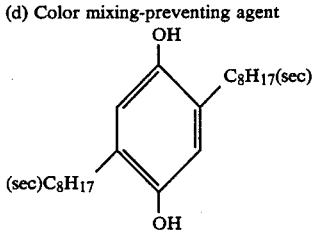
(e) Magenta coupler
See Table 1.
(f) Color image stabilizer
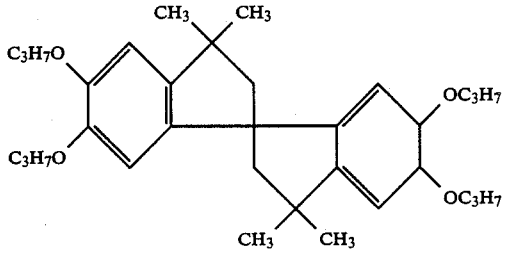
(g) Color image stabilizer
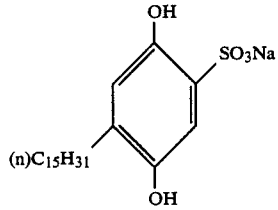
(h) Solvent
A 2:1 mixture (by volume) of:

-continued
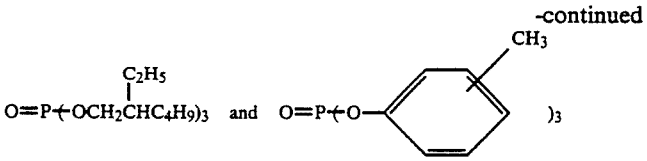
(i) UV ray absorbent
A 2:9:8 mixture (by weight) of:
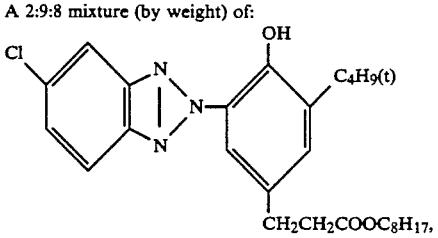
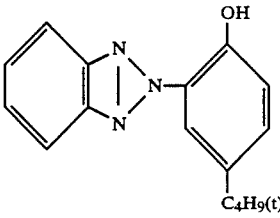
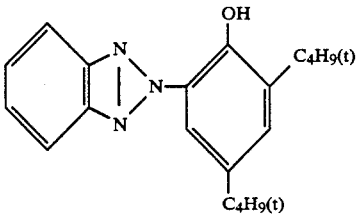
(j) Color mixing-preventing agent
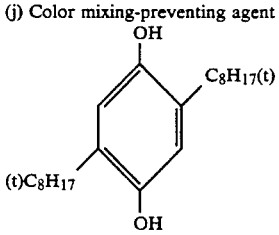
(k) Solvent
$O{=}P{\leftarrow}O{-}C_9H_{19}(iso))_3$
(l) Cyan coupler
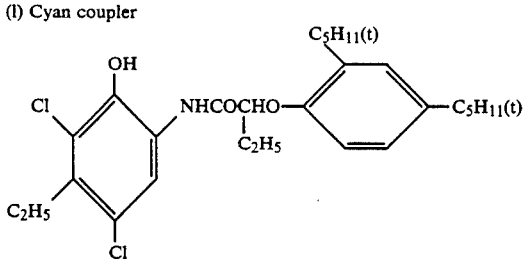
(m) Color image stabilizer
A 5:8:9 mixture (by weight) of:
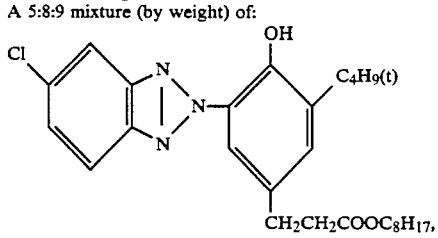
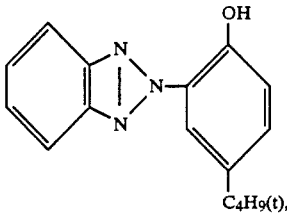
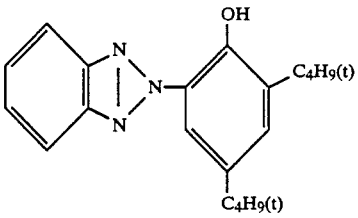

-continued (n) Polymer

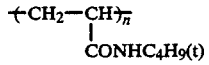

average molecular weight: 35,000

(o) Solvent

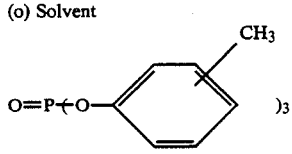

Color photographic printing papers containing varying magenta couplers as shown in Table 1 were prepared. The resulting photographic papers were exposed through an optical wedge, then processed according to the following steps.

| Processing Step | Temp. | Time |
|---|---|---|
| Color development | 38° C. | 1 min. and 40 sec. |
| Bleach-fixing | 30–34° C. | 1 min. and 00 sec. |
| Rinsing (1) | 30–34° C. | 20 sec. |
| Rinsing (2) | 30–34° C. | 20 sec. |
| Rinsing (3) | 30–34° C. | 20 sec. |
| Drying | 70–80° C. | 50 sec. |

(Three-tank counter current manner of rinsing (3) to (1) was employed.)

The formulations of respective processing solutions are as follows.

| Color developer | |
|---|---|
| Water | 800 ml |
| Compound A | See Table 1. |
| Triethanolamine | 8.0 g |
| Diethylenetriaminepentaacetic acid | 1.0 g |
| 1-Hydroxyethylidene-1,1-diphosphonic acid (60%) | 2.0 g |
| Nitrilotriacetic acid | 2.0 g |
| Benzyl alcohol | See Table 1. |
| Diethylene glycol | 10 ml |
| Sodium sulfite | See Table 1. |
| Potassium bromide | 0.5 g |
| Potassium carbonate | 30 g |
| 4-Amino-3-methyl-N-ethyl-N-(β-(methanesulfonamido)ethyl)aniline sulfate | 5.5 g |
| Fluorescent brightening agent (WHITEX 4B, made by Sumitomo Chemical Co., Ltd.) | 1.5 g |
| Water to make | 1,000 ml |
| pH | 10.25 |

-continued

| Bleach-fixinq solution | |
|---|---|
| Water | 400 ml |
| Ammonium thiosulfate (70%) | 200 ml |
| Sodium sulfite | 20 g |
| Iron (III) ammonium ethylenediamine-tetraacetate | 60 g |
| Disodium ethylenediamine-tetraacetate | 10 g |
| Water to make | 1,000 ml |
| pH (25° C.) | 7.00 |

| Rinsing solution | |
|---|---|
| Benzotriazole | 1.0 g |
| Ethylenediamine-N,N,N'N'-tetramethyl-enephosphonic acid | 0.3 g |
| Water to make | 1,000 ml |
| pH (25° C.) | 7.50 |

On the other hand, part of each of the above-described color developers was taken in a 1-liter beaker, and was allowed to stand at 40° C. for 30 days in an open state. The thus aged solutions were also used in the above-described processing.

Processing using the color developers which were allowed to stand for 30 days (aged solutions) were referred to as aged solution tests, and processings using color developers before having been allowed to stand (fresh solutions) were referred to as fresh solution tests.

The photographic properties obtained by the fresh solution tests and the aged solution tests are tabulated in Table 1.

Photographic properties are presented in terms of $D_{min}$ and gradation of magenta density.

$D_{min}$ represents a minimum density, and gradation is presented in terms of the change in density from the point of 0.5 in density to the point on 0.3 in log E higher exposure side.

TABLE 1

| | | Additives | | | Photographic properties | | | | |
|---|---|---|---|---|---|---|---|---|---|
| | | | | | Fresh soln. | | Aged soln.Dmin | | |
| No. | Magenta coupler | Compound A (0.05 mol/l | Benzyl alcohol ml/l | Sodium sulfite mol/l | $D_{min}$ | Gradation | Dmin | Gradation | Remarks |
| 1 | M-(a)*1 | II-(a)*3 | 15 | $1.5 \times 10^{-2}$ | 0.13 | 0.72 | 0.30 | 0.85 | Comparative Example |
| 2 | " | " | — | $1.5 \times 10^{-2}$ | 0.13 | 0.69 | 0.23 | 0.83 | Comparative Example |
| 3 | " | " | — | — | 0.12 | 0.71 | 0.24 | 0.81 | Comparative Example |
| 4 | " | II-(b)*4 | — | — | 0.12 | 0.74 | 0.22 | 0.81 | Comparative Example |
| 5 | M-(b)*2 | " | — | $1.5 \times 10^{-2}$ | 0.12 | 0.72 | 0.20 | 0.82 | Comparative Example |
| 6 | M-(b)*2 | II-(b)*4 | — | — | 0.12 | 0.74 | 0.21 | 0.80 | Comparative Example |
| 7 | M-37 | II(a)*3 | — | — | 0.13 | 0.72 | 0.20 | 0.81 | Comparative Example |

TABLE 1-continued

| No. | Magenta coupler | Additives: Compound A (0.05 mol/l | Additives: Benzyl alcohol ml/l | Additives: Sodium sulfite mol/l | Photographic properties: Fresh soln. $D_{min}$ | Fresh soln. Gradation | Aged soln. Dmin | Aged soln. Gradation | Remarks |
|---|---|---|---|---|---|---|---|---|---|
| 8 | M-37 | II-(b)*4 | — | — | 0.12 | 0.75 | 0.15 | 0.80 | Comparative Example |
| 9 | M-37 | II-7 | — | $1.5 \times 10^{-2}$ | 0.12 | 0.75 | 0.13 | 0.78 | Present Invention |
| 10 | M-37 | II-7 | — | $0.5 \times 10^{-2}$ | 0.12 | 0.76 | 0.13 | 0.78 | Present Invention |
| 11 | M-37 | II-7 | — | $0.1 \times 10^{-2}$ | 0.12 | 0.77 | 0.13 | 0.78 | Present Invention |
| 12 | M-37 | II-7 | — | — | 0.12 | 0.78 | 0.13 | 0.78 | Present Invention |
| 13 | M-37 | II-7 | 5 | — | 0.13 | 0.79 | 0.14 | 0.80 | Present Invention |
| 14 | M-37 | II-7 | 10 | — | 0.13 | 0.80 | 0.14 | 0.81 | Present Invention |
| 15 | M-37 | II-7 | 15 | — | 0.13 | 0.81 | 0.15 | 0.82 | Present Invention |
| 16 | M-37 | II-7 | 15 | $1.5 \times 10^{-2}$ | 0.12 | 0.78 | 0.14 | 0.80 | Present Invention |
| 17 | M-37 | II-12 | — | — | 0.12 | 0.78 | 0.13 | 0.79 | Present Invention |
| 18 | M-37 | II-22 | — | — | 0.12 | 0.78 | 0.13 | 0.78 | Present Invention |
| 19 | M-37 | II-28 | — | — | 0.12 | 0.79 | 0.13 | 0.79 | Present Invention |
| 20 | M-37 | II-49 | — | — | 0.12 | 0.78 | 0.13 | 0.78 | Present Invention |
| 21 | M-30 | II-7 | — | — | 0.12 | 0.80 | 0.13 | 0.80 | Present Invention |
| 22 | M-42 | II-7 | — | — | 0.12 | 0.79 | 0.13 | 0.79 | Present Invention |
| 23 | M-43 | II-7 | — | — | 0.12 | 0.81 | 0.13 | 0.82 | Present Invention |
| 24 | M-57 | II-7 | — | — | 0.12 | 0.82 | 0.13 | 0.82 | Present Invention |
| 25 | M-79 | II-7 | — | — | 0.12 | 0.80 | 0.13 | 0.81 | Present Invention |
| 26 | M-81 | II-7 | — | — | 0.12 | 0.79 | 0.13 | 0.80 | Present |

TABLE 1-continued

| No. | Magenta coupler | Additives: Compound A (0.05 mol/l | Additives: Benzyl alcohol ml/l | Additives: Sodium sulfite mol/l | Photographic properties: Fresh soln. $D_{min}$ | Photographic properties: Fresh soln. Gradation | Photographic properties: Aged soln. Dmin | Photographic properties: Aged soln. Gradation | Remarks |
|---|---|---|---|---|---|---|---|---|---|
| | | | | | | | | | Invention |

*1Comparative magenta coupler (M-(a)

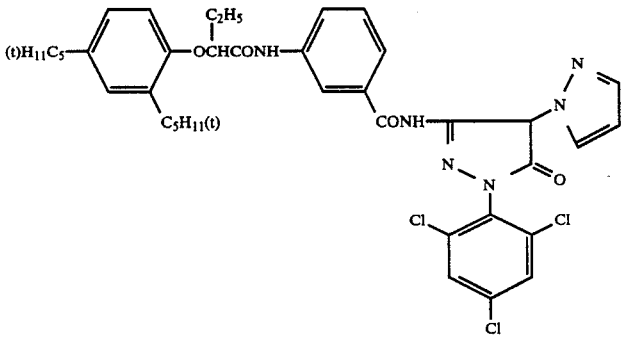

*2Comparative magenta coupler (M-(b))

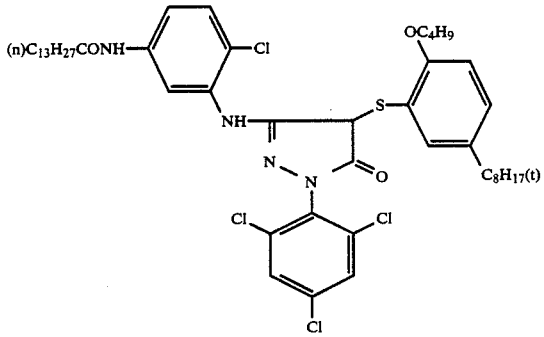

*3Additive (II-(a)) for comparative color developer $H_2NOH$

*4Additive (II-(b)) for comparative color developer

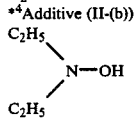

It is seen from Table 1 that, in the comparative examples, a large increase in $D_{min}$ and a large change in gradation are observed with the aged solutions (Nos. 1 to 6). A large change in $D_{min}$ is observed even with the couplers of the present invention when color developers outside the scope of the present invention are used (Nos. 7 and 8).

According to the present invention, photographic properties are less changed, and the absence of sodium sulfite and benzyl alcohol provides more remarkable advantages (comparison of No. 12 with Nos. 9 to 11 and Nos. 13 to 16).

EXAMPLE 2

The same experiments as with No. 12 in Example 1 were conducted except for changing the magenta coupler M-37 to M-58, M-70, M-71, M-72 or M-74 to obtain preferable results as in Example 1.

EXAMPLE 3

Multi-layer color photographic printing papers having the stratum structures shown below on a paper support double-laminated with polyethylene were prepared while changing the magenta coupler. Coating solutions were prepared as follows.

Preparation of a coating solution for forming the first layer 27.2 cc of ethyl acetate and 7.7 cc (8.0 g) of a high-boiling solvent (Solv-1) were added to 19.1 g of a yellow coupler (ExY-1) and 4.4 g of a color image stabilizer (Cpd-1), and the resulting solution was emulsified and dispersed in 185 cc of a 10% gelatin aqueous solution containing 8 cc of 10% sodium dodecylbenzenesulfonate. This emulsion dispersion was mixed with emulsions EM-7 and EM-8 while controlling the gelatin concentration according to the following formulation to prepare a coating solution for forming the first layer. Coating solutions for forming the second to seventh layers were also prepared in the same manner as with the coating solution for the first layer. As a gelatin hardener for each layer, the sodium salt of 1-hydroxy-3,5-dichloro-s-triazine was used.

As a thickening agent, (Cpd-1) was used.

(Stratum structure)

The formulation of each layer is shown below. Numerals represent coated amounts (g/m$^2$). Amounts of silver halide emulsions are represented as amounts of coated silver.

| Support<br>Polyethylene-laminated paper (containing a white pigment ($TiO_2$) and a bluish dye in polyethylene on the first layer side) | |
|---|---|
| **First layer (blue-sensitive layer)** | |
| Monodispersed AgClBr emulsion (EM-7) spectrally sensitized with sensitizing dye (ExS-1) | 0.15 |
| Monodispersed AgClBr emulsion (EM-8) spectrally sensitized with sensitizing dye (ExS-1) | 0.15 |
| Gelatin | 1.86 |
| Yellow coupler (ExY-1) | 0.82 |
| Color image stabilizer (Cpd-2) | 0.19 |
| Solvent (Solv-1) | 0.35 |
| **Second layer (color mixing-preventing layer)** | |
| Gelatin | 0.99 |
| Color mixing-preventing agent (Cpd-3) | 0.08 |
| **Third layer (Green-sensitive layer)** | |
| Monodispersed AgClBr emulsion(EM-9) spectrally sensitized with sensitizing dyes (ExS-2,3) | 0.12 |
| Monodispersed AgClBr emulsion(EM-10) spectrally sensitized with sensitizing dyes (ExS-2,3) | 0.24 |
| Gelatin | 1.24 |
| Magenta coupler | See TABLE 2. |
| Color image stabilizer (Cpd-4) | 0.25 |
| Color image stabilizer (Cpd-5) | 0.12 |
| Solvent (Solv-2) | 0.25 |
| **Fourth layer (UV ray-absorbing layer)** | |
| Gelatin | 1.60 |
| UV ray absorbent (Cpd-6/Cpd-7/Cpd-8 = 3/2/6 by weight) | 0.70 |
| Color mixing-preventing agent (Cpd-9) | 0.05 |
| Solvent (Solv-3) | 0.42 |
| **Fifth layer (Red-sensitive layer)** | |
| Monodispersed AgClBr emulsion(EM-11) spectrally sensitized with sensitizing dyes (ExS-4,5) | 0.07 |
| Monodispersed AgClBr emulsion (EM-12) spectrally sensitized with sensitizing dyes (ExS-4,5) | 0.16 |
| Gelatin | 0.92 |

-continued

| | |
|---|---|
| Cyan coupler (ExC-1) | 1.46 |
| Cyan coupler (ExC-2) | 1.84 |
| Color image stabilizer (Cpd-7/Cpd-8/Cpd-10 = 3/4/2 by weight) | 0.17 |
| Polymer (Cpd-11) for dispersion | 0.14 |
| Solvent (Solv-1) | 0.20 |
| **Sixth layer (UV ray-absorbing layer)** | |
| Gelatin | 0.54 |
| UV ray absorbent (Cpd-6/Cpd-8/Cpd-10 = 1/5/3 by weight) | 0.21 |
| Solvent (Solv-4) | 0.08 |
| **Seventh layer (Protective layer)** | |
| Gelatin | 1.33 |
| Acryl-modified copolymer of polyvinyl alcohol (modification degree: 17%) | 0.17 |
| Liquid paraffin | 0.03 |

Cpd-12 and Cpd-13 were used as irradiation-preventing dyes.

In each layer were further used, as emulsifying and dispersing agents or coating aids, Alkanol XC (made by duPont), sodium alkylbenzenesulfonate, succinic ester, and Magefacx F-120 (made by Dainippon Ink & Chemicals, Inc.). Further, Cpd-14 and Cpd-15 were used as stabilizers for silver halides.

Details of the emulsions used are as follows.

| Emulsion | Shape | Grain Size (μm) | Br Content (mol %) | Coefficient of Variation* |
|---|---|---|---|---|
| EM-7 | Cube | 1.1 | 1.0 | 0.10 |
| EM-8 | Cube | 0.8 | 1.0 | 0.10 |
| EM-9 | Cube | 0.45 | 1.5 | 0.09 |
| EM-10 | Cube | 0.34 | 1.5 | 0.09 |
| EM-11 | Cube | 0.45 | 1.5 | 0.09 |
| EM-12 | Cube | 0.34 | 1.6 | 0.10 |

$* = \frac{\text{Standard deviation}}{\text{Average grain size}}$ (showing grain size distribution degree)

Structural formulae of the used compounds are as follows.

ExY-1

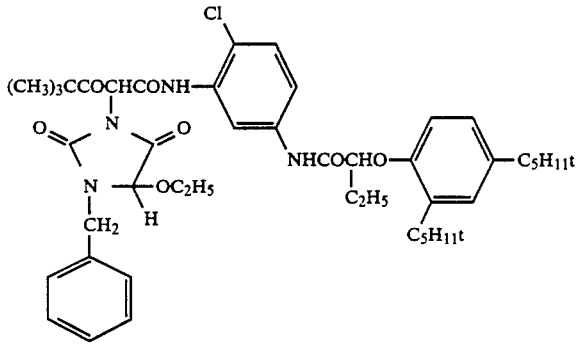

ExC-1

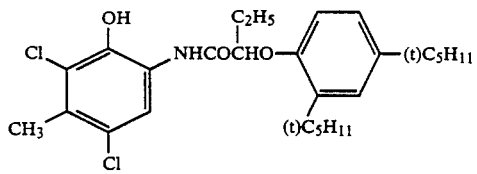

-continued
ExC-2
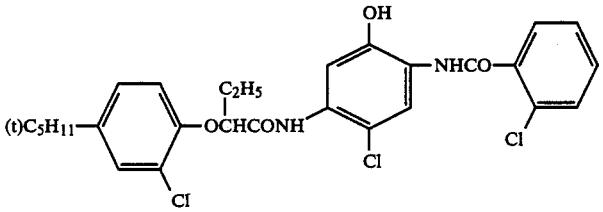
ExS-1
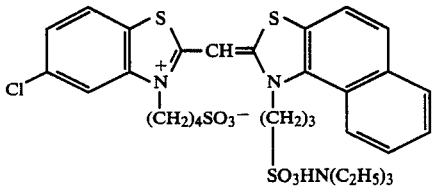
ExS-2
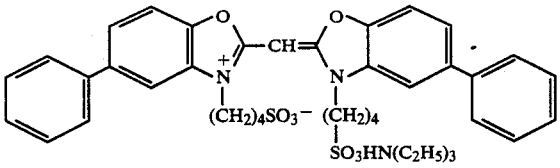
ExS-3
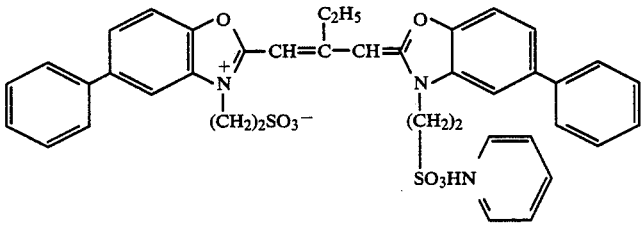
ExS-4
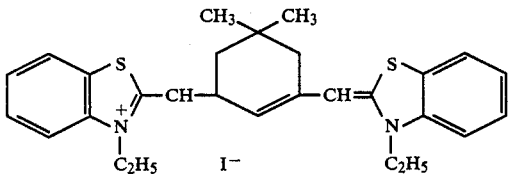
ExS-5
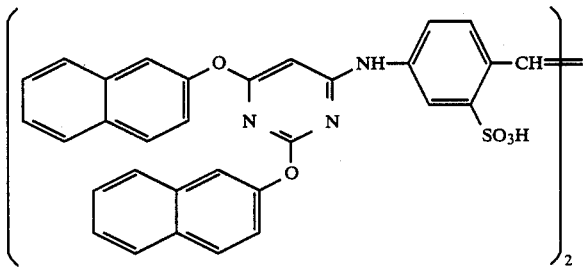
Cpd-1
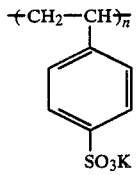
(n = 500–1,000)

-continued
Cpd-2
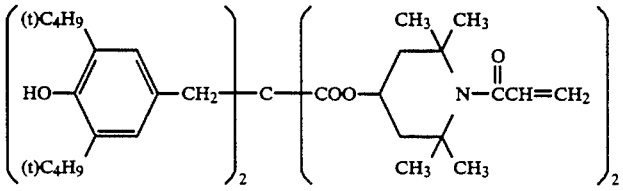
Cpd-3
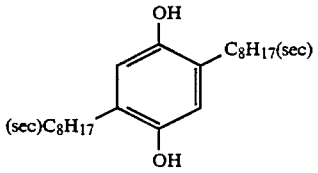
Cpd-4
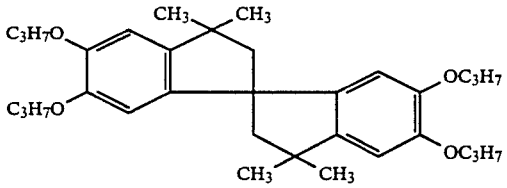
Cpd-5
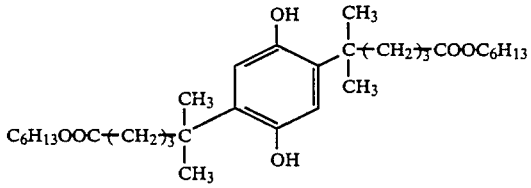
Cpd-6
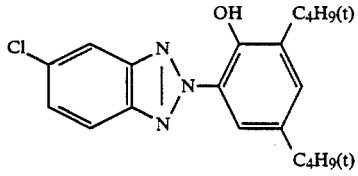
Cpd-7
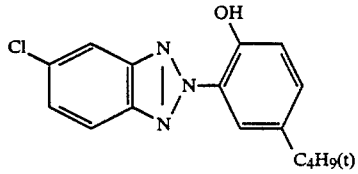
Cpd-8
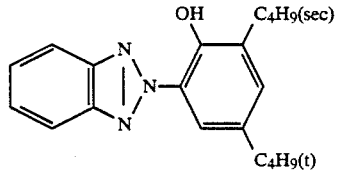
Cpd-9
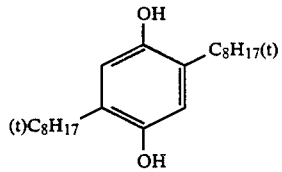

-continued

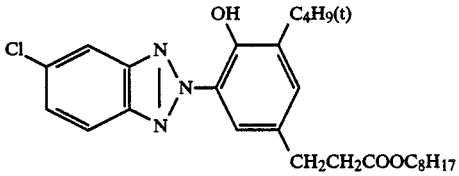

Cpd-10

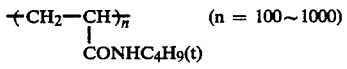

(n = 100~1000)

Cpd-11

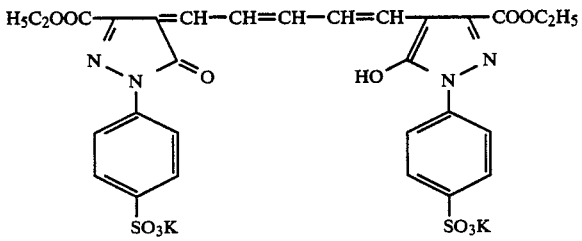

Cpd-12

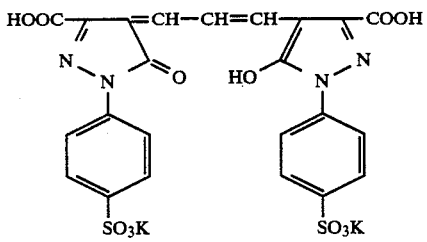

Cpd-13

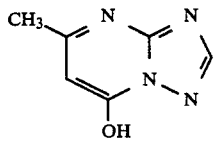

Cpd-14

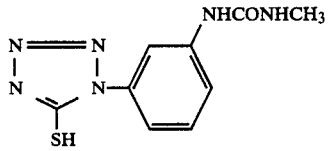

Cpd-15

| | |
|---|---|
| Dibutyl phthalate | Solv-1 |
| Trioctyl phosphate | Solv-2 |
| Trinonyl phosphate | Solv-3 |
| Tricresyl phosphate | Solv-4 |

Magenta couplers used are as follows.

| | | |
|---|---|---|
| Sample A | Magenta coupler M-(a) | (See Example 1.) |
| Sample B: | Magenta coupler M (b) | (See Example 1.) |
| Sample C: | Magenta coupler M-37 | |
| Sample D: | Magenta coupler M-42 | |
| Sample E: | Magenta coupler M-43 | |
| Sample F: | Magenta coupler M-57 | |

Running testing was conducted according to the following steps while changing the formulation of the color developers. The processing steps were as follows. Processing amount was 15 $m^2$/day in respective processings, and the processing was conducted for 30 days.

| Processing steps | Temp. | Time | Replenishing Amount* | Tank volume |
|---|---|---|---|---|
| Color development | 35° C. | 45 sec | 140 ml | 17 liters |
| Bleach-fixing | 30–36° C. | 45 sec | 215 ml | 17 liters |
| Stabilizing (1) | 30–37° C. | 20 sec | — | 10 liters |
| Stabilizing (2) | 30–37° C. | 20 sec | — | 10 liters |
| Stabilizing (3) | 30–37° C. | 20 sec | 200 ml | 10 liters |
| Drying | 70–85° C. | 60 sec | | |

*per $m^2$ of light-sensitive material (Stabilizing was conducted in a 3-tank·counter current manner of stabilizing (3) → (1).)

The formulation of respective processing solutions were as follows.

| Color developer | Tank Solution | Replenishing Solution |
|---|---|---|
| Water | 800 ml | 800 ml |

-continued

| | | |
|---|---|---|
| Ethylenediaminetetraacetic acid | 2.0 g | 2.0 g |
| 5,6-Dihydroxybenzene-1,2,4-tri-sulfonic acid | 0.3 g | 0.3 g |
| Triethanolamine | 8.0 g | 8.0 g |
| Sodium chloride | 1.4 g | — |
| Potassium carbonate | 25 g | 25 g |
| N-Ethyl-N-(β-methanesulfonamido-ethyl)-3-methyl-4-aminoaniline sulfate | 5.0 g | 7.0 g |
| Compound B of the present invention | See Table 2. | |
| Fluorescent brightening agent (4,4'-diaminostilbene type) | 2.0 g | 2.5 g |
| Water to make | 1,000 ml | 1,000 ml |
| pH (25° C.) | 10.05 | 10.45 |

Bleach-fixinq solution
(Tank solution and replenishing solution had the same formulation)

| | |
|---|---|
| Water | 400 ml |
| Ammonium thiosulfate (70%) | 100 ml |
| Sodium sulfite | 17 g |
| Iron (III) ammonium ethylenediamine-tetraacetate | 55 g |
| Disodium ethylenediaminetetraacetate | 5 g |
| Glacial acetic acid | 7 g |
| Water to make | 1,000 ml |
| pH (25° C.) | 5.6 |

Stabilizing solution

-continued (Tank solution and replenishing solution had the same formulation)

| | |
|---|---|
| Formalin (37%) | 0.1 g |
| Formalin-sulfurous acid adduct | 0.7 g |
| 5-Chloro-2-methyl-4-isothiazolin-3-one | 0.02 g |
| 2-Methyl-4-isothiazolin-3-one | 0.01 g |
| Copper sulfate | 0.005 g |
| Water to make | 1,000 ml |
| pH (25° C.) | 4.0 |

Running testing (continuous processing) was conducted under each condition until the amount of replenishing color developer became three times as much as the tank volume (17 liters). Change in stain and in G (green density) of gradation portion were measured at the start and the .end of the running processing using an automatic recording densitometer (type of Fuji Photo Film Co., Ltd.). Further, samples at the end of the running processing were allowed to stand at 60° C. (5–10% RH) for 4 months, and again subjected to measurement of change in G density in stained areas.

The following photographic properties of the magenta dyes at the start and the end of the running testing are shown in Table 2.

TABLE 2

| | Additive to Color Developer (Compound B) | | | | | | | | |
|---|---|---|---|---|---|---|---|---|---|
| | II-(b)*2 (Comparative example) | | | II-7 (Present invention) | | | II-12 (Present Invention) | | |
| Sample | $\Delta D_{min}$ (*3) | ΔGradation (*4) | $\Delta D_{min}$ after aging (*5) | $\Delta D_{min}$ (*3) | ΔGradation (*4) | $\Delta D_{min}$ after aging (*5) | $\Delta D_{min}$ (*3) | ΔGradation (*4) | $\Delta D_{min}$ after aging (*5) |
| A*1 (Comparative Example) | +0.03 | +0.6 | +0.15 | 0 +0.02 | +0.04 | +0.13 | +0.02 | +0.03 | +0.13 |
| B*1 (B*1) | +0.03 | +0.06 | +0.16 | +0.02 | +0.03 | +0.14 | +0.02 | +0.03 | +0.15 |
| C (Present Invention) | +0.03 | +0.05 | +0.19 | +0.01 | +0.01 | +0.10 | +0.01 | +0.01 | +0.10 |
| D (D) | +0.03 | +0.06 | +0.18 | +0.01 | +0.01 | +0.10 | +0.01 | +0.01 | +0.10 |
| E (E) | +0.03 | +0.05 | +0.19 | +0.01 | +0.02 | +0.10 | +0.01 | +0.01 | +0.10 |
| F (F) | +0.03 | +0.06 | +0.19 | +0.02 | +0.01 | +0.11 | +0.01 | +0.01 | +0.10 |

| | Additive to Color Developer (Compound B) | | | | | |
|---|---|---|---|---|---|---|
| | II-22 | | | II-49 | | |
| Sample | $\Delta D_{min}$ (*3) | ΔGradation (*4) | $\Delta D_{min}$ after aging (*5) | $\Delta D_{min}$ (*3) | ΔGradation (*4) | $\Delta D_{min}$ after aging (*5) |
| A*1 (Comparative Example) | +0.02 | +0.04 | +0.14 | +0.02 | +0.04 | +0.14 |
| B*1 (B*1) | +0.02 | +0.03 | +0.14 | +0.02 | +0.04 | +0.14 |
| C (Present Invention) | +0.01 | +0.01 | +0.10 | +0.01 | +0.01 | +0.10 |
| D (D) | +0.01 | +0.01 | +0.10 | +0.01 | +0.01 | +0.11 |
| E (E) | +0.02 | +0.01 | +0.11 | +0.02 | +0.02 | +0.11 |
| F | +0.01 | +0.01 | +0.11 | +0.02 | +0.01 | +0.11 |

TABLE 2-continued (F)

*1 Comparative magenta couplers M-(a) and M-(b) used in sample A and Sample B are described in Example 1.
*2 Additive II-(b) for comparative color developer is described in Example 1.
*3 An increase in $D_{min}$ at the end of running test based on $D_{min}$ at the start of running test (stein).
*4 An increase in G density of gradation portion at the end of the running based on G density of gradation portion at the start of running.
*5 An increase in $D_{min}$ of a sample aged at 60° C. for 4 months based on its $D_{min}$ at the end of running.

Table 2 shows that, in the comparative examples, an increase in $D_{min}$ $\Delta D_{min}$), an increase in gradation (Δgradation) and an increase in $D_{min}$ after agin $\Delta D_{min}$ after aging) were very high when II-(b) was used as the additive (compound B) to the color developer, and that, in the case of using Sample A or B (containing magenta couplers outside the scope of the present invention),$D_{min}$, gradation and change in $\Delta D_{min}$ after aging were very high even when color developers of the present invention were used.

According to the present invention, the above-described changes in photographic properties are markedly lowered.

While the present invention has been described in detail and with reference to specific embodiments thereof, it is apparent to one skilled in the art that various changes and modifications can be made therein without departing from the spirit and the scope of the present invention.

What is claimed is:

1. A method for processing a silver halide color photographic material containing at least one pyrazoloazole magenta coupler represented by general formula (I), which comprises processing the light-sensitive material, after imagewise exposure, with a color developer containing an aromatic primary amine color developing agent and at least one member selected from among hydrazines and hydrazides represented by general formula (II):

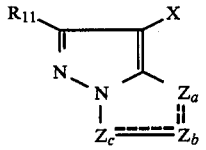

(I)

wherein $R_{11}$ represents a hydrogen atom or a substituent, X represents a hydrogen atom or a group capable of being eliminated by a coupling reaction with an oxidation product of an aromatic primary amine developing agent, Za, Zb and Zc each represents a methine group, a substituted methine group, =N— or —NH—, provided that one of the Za-Zb bond and the Zb-Zc bond is a double bond and the other is a single bond and, when Zb-Zc is a carbon-to-carbon double bond, it may be a part of an aromatic ring, and a dimer or higher polymer may be formed at Rll or X, or, when Za, Zb or Zc represents a substituted methine group, a dimer or higher polymer may be formed at the substituted methine group;

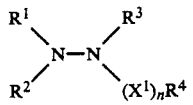

(II)

wherein $R^1$, $R^2$ and $R^3$ each independently represents a hydrogen atom, an alkyl group, an aryl group or a heterocyclic group, R4 represents a hydrogen atom, a hydroxy group, a hydrazino group, an alkyl group, an aryl group, a heterocyclic group, an alkoxy group, an aryloxy group, a carbamoyl group or an amino group, $X^1$ represents a divalent group, and n represents 0 or 1, provided that, when n is 0, $R^4$ represents an alkyl group, an aryl group or a heterocyclic group, and that $R^3$ and $R^4$ may together form a heterocyclic ring.

2. The method for processing the silver halide color photographic material as in claim 1, wherein said color developer does not substantially contain sulfite ion.

3. The method for processing the silver halide color photographic material as in claim 1, wherein said color developer contains 5 ml or less benzyl alcohol.

4. The method for processing the silver halide color photographic material as in claim 1, wherein said pyrazoloazole magenta coupler is selected from the group consisting of the couplers represented by general formulae (Ia), (Ib), (Ic), (Id), (Ie), and (If):

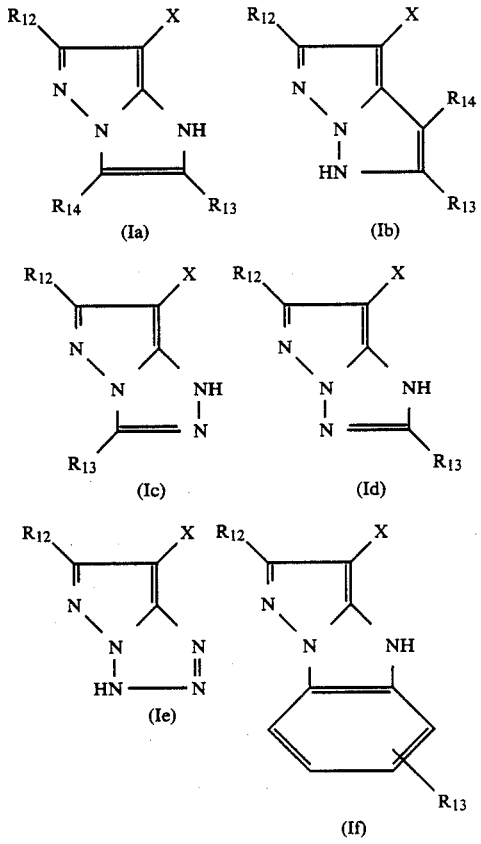

(Ia) (Ib) (Ic) (Id) (Ie) (If)

5. The method for processing the silver halide color photographic material as in claim 1, wherein said hydrazines and hydrazides represented by general formula (II) are present in amounts of 0.01 g to 50 g per liter of color developer.

6. The method for processing the silver halide color photographic material as in claim 2, wherein the content of the sulfite ion is 0 to 0.005 mol per liter.

7. The method for processing the silver halide color photographic material as in claim 3, wherein the content of the benzyl alcohol is 2 ml or less per liter.

8. The method for processing the silver halide color photographic material as in claim 1, wherein the silver halide emulsion for the light-sensitive material comprises 80 to 100 mol % of silver chloride.

* * * * *